(12) United States Patent
Olson et al.

(10) Patent No.: US 12,590,849 B2
(45) Date of Patent: Mar. 31, 2026

(54) ACTIVATABLE WARMING INDICATOR WITHOUT DYE

(71) Applicant: Temptime Corporation, Morris Plains, NJ (US)

(72) Inventors: John Olson, Dayton, NJ (US); Eric W. Liberato, Pequannock, NJ (US); Mohannad Abdo, Clifton, NJ (US); Steven Feldman, Morristown, NJ (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 665 days.

(21) Appl. No.: 17/193,741

(22) Filed: Mar. 5, 2021

(65) Prior Publication Data

US 2022/0283041 A1 Sep. 8, 2022

(51) Int. Cl.
| | |
|---|---|
| *G01K 11/12* | (2021.01) |
| *B32B 27/08* | (2006.01) |
| *B32B 27/32* | (2006.01) |
| *G01K 11/06* | (2006.01) |

(Continued)

(52) U.S. Cl.
CPC .............. *G01K 11/12* (2013.01); *B32B 27/08* (2013.01); *B32B 27/322* (2013.01); *G01K 11/06* (2013.01); *G01K 11/125* (2013.01); *G01K 11/18* (2013.01); *B32B 2307/30* (2013.01);

(Continued)

(58) Field of Classification Search
CPC ...... G01K 11/06; G01K 11/12; G01K 11/125;

G01K 11/18; B32B 27/08; B32B 27/322; B32B 2307/30; B32B 2307/4023; B32B 2307/41; B32B 2307/412; B32B 2307/75
See application file for complete search history.

(56) References Cited

U.S. PATENT DOCUMENTS

| | | | | |
|---|---|---|---|---|
| 4,428,321 | A | * | 1/1984 | Arens ..................... G01K 3/04 |
| | | | | 252/962 |
| 5,667,303 | A | | 9/1997 | Arens et al. |
| 6,614,728 | B2 | | 9/2003 | Spevacek |

(Continued)

OTHER PUBLICATIONS

Search Report and Written Opinion dated Jun. 16, 2022 issued for International PCT Application No. PCT/US2022/018626.

(Continued)

*Primary Examiner* — Gerard Higgins
(74) *Attorney, Agent, or Firm* — K&L Gates LLP

(57) ABSTRACT

A temperature exposure indicator includes a reservoir of meltable material having a melting point at an activation threshold of the temperature exposure indicator. The temperature exposure indicator also includes a light scattering material having voids and an indicia overlayed by the light scattering material such that the indicia is initially obscured by the light scattering material prior to the meltable material being exposed to a temperature above the activation threshold. The reservoir is in fluid communication with the light scattering material, such that the meltable material, when exposed to a temperature at or above the activation threshold, is configured to melt and flow into the voids of the light scattering material thereby causing the light scattering material to transition from an obscuring form to a non-obscuring form so that the indicia is viewable through the light scattering material.

20 Claims, 14 Drawing Sheets

(51) Int. Cl.
  *G01K 11/125*  (2021.01)
  *G01K 11/18*  (2006.01)

(52) U.S. Cl.
  CPC ... *B32B 2307/4023* (2013.01); *B32B 2307/41*
    (2013.01); *B32B 2519/00* (2013.01)

(56) References Cited

U.S. PATENT DOCUMENTS

| | | | |
|---|---|---|---|
| 6,741,523 B1 | 5/2004 | Bommarito et al. | |
| 2008/0232427 A1* | 9/2008 | Leute ..................... | G01K 3/005 |
| | | | 374/161 |
| 2009/0301382 A1 | 12/2009 | Patel | |
| 2010/0192833 A1 | 8/2010 | Yang et al. | |
| 2010/0247900 A1 | 9/2010 | Parker et al. | |
| 2012/0079980 A1 | 4/2012 | Taylor et al. | |
| 2012/0079981 A1* | 4/2012 | Huffman ................ | G01K 11/06 |
| | | | 116/207 |
| 2019/0285482 A1 | 9/2019 | Abdo et al. | |
| 2019/0346415 A1 | 11/2019 | Abdo et al. | |
| 2020/0348187 A1 | 11/2020 | Li et al. | |

OTHER PUBLICATIONS

Extended European Search Report dated Jun. 6, 2025 issued for European Patent Application No. 22764021.6.

* cited by examiner

100

112

122

142

132

110

120

140

130

Detail
2A-2C

PRIOR TO ACTIVATION
(e.g., in obscuring form)

DURING ACTIVATION
(e.g., transitioning from obscuring
form to non-obscuring form)

POST ACTIVATION
(e.g., in non-obscuring form)

100a  100b

PRIOR TO ACTIVATION
(e.g., in obscuring form)

100a  100b

DURING ACTIVATION
(e.g., transitioning from obscuring
form to non-obscuring form)

100a  100b 130a  130b

POST ACTIVATION
(e.g., in non-obscuring form)

200

212

222

242

232

210

220

240

230

250

410

412

465a

410

412

475

477

ACTIVATABLE WARMING INDICATOR WITHOUT DYE

BACKGROUND

Many commercial products are temperature-sensitive or perishable and may lose efficacy or quality if they experience excessive ambient heat exposure before they are used. Examples of heat-sensitive commercial products include certain pharmaceuticals, medical products, and foodstuffs as well as some industrial products. Temperature indicators are known which can provide a simple visual indication of the historical exposure of a host product to heat, e.g., cumulative or peak heat exposure. An indicator provided close to or on the product package is exposed over time to temperatures close to those experienced by the product itself. The visual indication can be used to provide a signal of whether a product may have lost quality, or freshness. Some temperature indicators can express or indicate historical temperature exposure to various conditions in a predictable, quantitative manner. For example, a temperature indicator can be used to indicate cumulative heat exposure (e.g., to indicate the useful shelf life) of temperature-sensitive or perishable host products, or for other purposes. Products may also be sensitive or perishable in response to other environmental factors, such as humidity, radiation, oxygen exposure, exposure to biologic materials of certain types, etc.

Known historical temperature exposure indicators based on chemical, electrochemical, or other physical changes in an indicator material may be cheaper can provide a color change at a predetermined end point to indicate possible loss of quality or freshness of the host product. The color change can be displayed in a suitable label, or the like, to be read optically, for example, visually by a human viewer or by an electronic device such as a bar code scanner or cell phone. The color change can be chromatic or achromatic or provided by another visually detectable optical parameter change. The temperature-response parameters over time of the temperature indicator can be configured to correlate with a deterioration characteristic of the host product to coordinate the color change appropriately with the likely condition of the host product. Other types of environmental exposure may behave in a similar fashion in response to exposure to humidity, oxygen, radiation, biologics, or other types of environmental factors that may affect host product acceptability.

One example peak or threshold temperature exposure indicator is the Safe-T-Vue® indicator, available from Zebra Technologies' Temptime Division. Safe-T-Vue® indicators are nonreversible temperature indicators for blood products and temperature-sensitive biologics. The Safe-T-Vue® indicator attaches directly to a blood bag and is adapted for maintaining quality control during temporary storage and transport. In an example, the Safe-T-Vue® indicator changes color from white to red when a specified temperature has been reached or exceeded.

Some known temperature indicators for cumulative heat exposure employ diacetylenic monomer compounds that polymerize in response to environmental conditions such as temperature exposure to provide a color change, for example VVM products available from Zebra Technologies' Temptime Division. Some other temperature indicators employ diffusion technology, for example, U.S. Pat. Nos. 6,741,523; 6,614,728; and 5,667,303; and 6,614,728. The rate of diffusion of a colorant, or other material, which varies based on temperature, may be used, e.g., to help show how much excess heat a product has been exposed to or how long a product has been above a threshold temperature, or other indications of time-temperature exposure. In addition to diffusion, other types of temperature or heat exposure indicators also rely on other kinds of movement of an indicator material in response to an environmental exposure, for example, freeze indicators where freezing of a liquid breaks a container, releasing a colorant, etc. These temperature or heat exposure indicators sometimes utilize dyes and pigments to provide a color change to indicate environmental conditions have changed.

Dyes and other flowing pigments or color-changing pigments can be expensive and increase the complexity of the manufacturing process when mass producing the heat exposure indicators.

All of the above types of environmental indicators may be enhanced, for example, by adding other features, e.g., utilizing an indicia to provide a color change indicator without relying on the use of dyes, color-changing materials, or other colorants in the temperature sensitive indicator material.

SUMMARY

Disclosed herein are environmental indicators for monitoring a predetermined environmental exposure, such as an exposure to a temperature above a specific temperature of interest. The environmental indicator(s) may be associated with a host product and may therefore track or indicate environmental exposure information about the host product. The environmental indicators may be temperature exposure indicator apparatus, such as an activatable warming indicator apparatus that indicates exposure to an environmental condition. The specific temperature of interest may be a predetermined threshold temperature that a host product would potentially be exposed to during its use.

Aspects of the subject matter described herein may be useful alone or in combination with one or more other aspects described herein. In an aspect of the present disclosure, a temperature exposure indicator includes a reservoir of meltable material, and the meltable material has a melting point at an activation threshold of the temperature exposure indicator. The temperature exposure indicator also includes a light scattering material having voids and an indicia overlayed by the light scattering material such that the indicia is initially obscured by the light scattering material prior to the meltable material being exposed to a temperature above the activation threshold. The reservoir is in fluid communication with the light scattering material, such that the meltable material, when exposed to a temperature at or above the activation threshold, is configured to melt and flow into the voids of the light scattering material thereby causing the light scattering material to transition from an obscuring form to a non-obscuring form so that the indicia is viewable through the light scattering material.

In another aspect of the present disclosure, which may be used in combination with any other aspect or combination of aspects listed herein, the meltable material is configured to solidify within the voids of the light scattering material upon return to a temperature below the activation threshold, such that the light scattering material remains in the non-obscuring form and the light scattering material is transparent.

In another aspect of the present disclosure, which may be used in combination with any other aspect or combination of aspects listed herein, the non-obscuring form of the light scattering material persists after the meltable material re-solidifies at a temperature below the activation threshold.

In another aspect of the present disclosure, which may be used in combination with any other aspect or combination of aspects listed herein, the meltable material is configured to solidify within the voids of the light scattering material upon return to a temperature below the activation threshold. Upon solidification, the light scattering material returns to the non-obscuring form.

In another aspect of the present disclosure, which may be used in combination with any other aspect or combination of aspects listed herein, the light scattering material is made from a porous plastic material selected from the group consisting of Polytetrafluoroethylene (PTFE), Ultra High Molecular Weight Polyethylene (UHMW PE), Ultra High Molecular Weight Polypropylene (UHMW PP), High Density Polyethylene (HDPE) Polyvinylidene Fluoride (PVDF), Perfluoroalkoxy alkane (PFA), Liquid Crystalline Polymer (LPC) and Xydar® LCP.

In another aspect of the present disclosure, which may be used in combination with any other aspect or combination of aspects listed herein, the PTFE material is an opaque PTFE material that is in the obscuring form prior to being contacted by the meltable material.

In another aspect of the present disclosure, which may be used in combination with any other aspect or combination of aspects listed herein, the reservoir is a layer of meltable material that is positioned adjacent to the light scattering material and the indicia.

In another aspect of the present disclosure, which may be used in combination with any other aspect or combination of aspects listed herein, the temperature exposure indicator is a peak temperature exposure indicator.

In another aspect of the present disclosure, which may be used in combination with any other aspect or combination of aspects listed herein, the indicia includes a color, a dataform or a combination thereof.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, the meltable material comprises at a polymer having side chain crystallinity (SCC), an alkane, an alkyl ester, a wax or a combination thereof.

In another aspect of the present disclosure, which may be used in combination with any other aspect or combination of aspects listed herein, the activation threshold is one of (i) a predetermined cumulative heat exposure threshold, (ii) a predetermined peak heat exposure threshold, and (iii) a time-temperature exposure threshold.

In another aspect of the present disclosure, which may be used in combination with any other aspect or combination of aspects listed herein, the peak heat exposure threshold is in a range from about 0° C. to about 65° C., from about 0° C. to about 50° C., from about 0° C. to about 40° C., from about 0° C. to about 30° C., from about 0° C. to about 20° C., from about 0° C. to about 10° C., from about 10° C. to about 65° C., from about 15° C. to about 65° C., from about 25° C. to about 65° C., from about 35° C. to about 65° C., from about 45° C. to about 65° C., from about 0° C. to about 15° C., from about 5° C. to about 15° C., from about 15° C. to about 25° C., from about from about 25° C. to about 35° C., from about from about 35° C. to about 45° C., from about 5° C. to about 10° C., from about −20° C. to about 0° C., from about −20° C. to about −15° C., from about −20° C. to about −10° C., and from about −20° C. to about −5° C.

In another aspect of the present disclosure, which may be used in combination with any other aspect or combination of aspects listed herein, the peak heat exposure threshold is about 6° C.

In another aspect of the present disclosure, which may be used in combination with any other aspect or combination of aspects listed herein, the peak heat exposure threshold is about 10° C.

Aspects of the subject matter described herein may be useful alone or in combination with one or more other aspects described herein. In an aspect of the present disclosure, a visual warming indicator includes a reservoir of activation material configured to transition from a non-activated state to an activated state at an activation threshold, a light scattering material having voids, and an indicia overlayed by the light scattering material such that the indicia is initially obscured by the light scattering material prior to the activation material being exposed to an activation event at or above the activation threshold. The reservoir is in fluid communication with the light scattering material, such that the activation material, when exposed to an activation event at or above the activation threshold, is configured to transition to the activated state and flow into the voids of the light scattering material thereby causing the light scattering material to transition from an obscuring form to a non-obscuring form so that the indicia is viewable through the light scattering material.

In another aspect of the present disclosure, which may be used in combination with any other aspect or combination of aspects listed herein, the activation event is one of (i) a cumulative heat exposure, (ii) a peak heat exposure, and (iii) an exposure to a temperature for a period of time.

In another aspect of the present disclosure, which may be used in combination with any other aspect or combination of aspects listed herein, the activation threshold is one of (i) a predetermined cumulative heat exposure threshold, (ii) a predetermined peak heat exposure threshold, and (iii) a time-temperature exposure threshold.

In another aspect of the present disclosure, which may be used in combination with any other aspect or combination of aspects listed herein, the peak heat exposure threshold is a peak temperature exposure in a range from about 0° C. to about 65° C., from about 0° C. to about 50° C., from about 0° C. to about 40° C., from about 0° C. to about 30° C., from about 0° C. to about 20° C., from about 0° C. to about 10° C., from about 10° C. to about 65° C., from about 15° C. to about 65° C., from about 25° C. to about 65° C., from about 35° C. to about 65° C., from about 45° C. to about 65° C., from about 0° C. to about 15° C., from about 5° C. to about 15° C., from about 15° C. to about 25° C., from about 25° C. to about 35° C., t from about 35° C. to about 45° C., from about 5° C. to about 10° C., from about −20° C. to about 0° C., from about −20° C. to about −15° C., from about −20° C. to about −10° C., from about −20° C. to about −5° C.

Aspects of the subject matter described herein may be useful alone or in combination with one or more other aspects described herein. In an aspect of the present disclosure, a peak temperature exposure indicator includes a reservoir of meltable material, the meltable material comprising a polymer having side chain crystallinity (SCC) and having a melting point at an activation threshold of the peak temperature exposure indicator. The activation threshold is a peak temperature exposure in a range from about 5° C. to about 25° C. The peak temperature exposure indicator also includes a light scattering material, made from an opaque Polytetrafluoroethylene (PTFE), having voids. Additionally, the peak temperature exposure indicator includes an indicia overlayed by the light scattering material such that the indicia is initially obscured by the light scattering material prior to the meltable material being exposed to a temperature above the activation threshold. The reservoir is in fluid communication with the light scattering material, such that the meltable material, when exposed to a temperature at or above the activation threshold, is configured to melt and flow into the voids of the light scattering material thereby causing the light scattering material to transition from an obscuring form to a non-obscuring form so that the indicia is viewable through the light scattering material. Additionally, the meltable material is configured to solidify within the voids of the light scattering material upon return to a temperature below the activation threshold, such that the light scattering material remains in the non-obscuring form.

Aspects of the subject matter described herein may be useful alone or in combination with one or more other aspects described herein. In an aspect of the present disclosure, a temperature exposure indicator includes a substrate, an indicia overlaying the substrate, and a cavitated layer overlaying the indicia. The cavitated layer has voids such that the cavitated layer is (i) configured to obscure the indicia in an obscuring form and (ii) configured to reveal the indicia in a non-obscuring form. Additionally, the indicia is obscured by the cavitated layer when the cavitated layer is in the obscuring form, and the indicia is decipherable through the cavitated layer when the cavitated layer is in the non-obscuring form. The temperature exposure indicator also includes an activation layer overlaying the substrate, which is in fluid communication with the cavitated layer. The activation layer includes an activation material having an activation threshold and is configured to flow into the voids of the cavitated layer when exposed to an activation event at or above the activation threshold thereby causing the cavitated layer to transition from the obscuring form to the non-obscuring form.

In another aspect of the present disclosure, which may be used in combination with any other aspect or combination of aspects listed herein, the activation layer comprises an activation material suspended in a matrix with a resin.

In another aspect of the present disclosure, which may be used in combination with any other aspect or combination of aspects listed herein, the activation material is selected from the group consisting of an acid, ethyl-vinyl-acetates, glycols, adipates, sebacates, terephthalates, dibenzoates, gluterates, phthalates, azelates n-alkanes, side chain crystallinity (SCC), waxes, esters polyamides or polyolefins.

In another aspect of the present disclosure, which may be used in combination with any other aspect or combination of aspects listed herein, the acid is selected from the group consisting of phosphoric acid, dodecylbenzene sulfonic acid, benzenesulfonic acid or squaric acid.

In another aspect of the present disclosure, which may be used in combination with any other aspect or combination of aspects listed herein, the activation material comprises at least one of a polymer having side chain crystallinity (SCC), a meltable solid, an alkane, an alkyl ester, and a wax.

In another aspect of the present disclosure, which may be used in combination with any other aspect or combination of aspects listed herein, the activation layer and the cavitated layer are bonded together.

In another aspect of the present disclosure, which may be used in combination with any other aspect or combination of aspects listed herein, the indicia includes a color, a dataform or a combination thereof.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, upon return to an exposure below the activation threshold, the activation material is configured to solidify within the voids of the cavitated layer such that the cavitated layer remains in the non-obscuring form.

In another aspect of the present disclosure, which may be used in combination with any other aspect or combination of aspects listed herein, the indicator further includes a seal layer positioned between the indicia and the cavitated layer. The seal layer includes a styrene-butadiene binder, a styrene acrylic binder, a vinyl acrylic binder, polyamides, pressure sensitive adhesives (PSA), an acrylic water-based emulsion or combinations thereof.

In another aspect of the present disclosure, which may be used in combination with any other aspect or combination of aspects listed herein, the activation event is one of (i) a cumulative heat exposure, (ii) a peak heat exposure, and (iii) an exposure to a temperature for a period of time.

In another aspect of the present disclosure, which may be used in combination with any other aspect or combination of aspects listed herein, the activation threshold is one of (i) a predetermined cumulative heat exposure threshold, (ii) a predetermined peak heat exposure threshold, and (iii) a time-temperature exposure threshold.

In another aspect of the present disclosure, which may be used in combination with any other aspect or combination of aspects listed herein, the peak heat exposure threshold is a peak temperature exposure in a range from about 0° C. to about 65° C., from about 0° C. to about 50° C., from about 0° C. to about 40° C., from about 0° C. to about 30° C., from about 0° C. to about 20° C., from about 0° C. to about 10° C., from about 10° C. to about 65° C., from about 15° C. to about 65° C., from about 25° C. to about 65° C., from about 35° C. to about 65° C., from about 45° C. to about 65° C., from about 0° C. to about 15° C., from about 5° C. to about 15° C., from about 15° C. to about 25° C., from about 25° C. to about 35° C., from about 35° C. to about 45° C., from about 5° C. to about 10° C., from about −20° C. to about 0° C., from about −20° C. to about −15° C., from about −20° C. to about −10° C., from about −20° C. to about −5° C.

In another aspect of the present disclosure, which may be used in combination with any other aspect or combination of aspects listed herein, the peak heat exposure threshold is about 6° C.

In another aspect of the present disclosure, which may be used in combination with any other aspect or combination of aspects listed herein, the peak heat exposure threshold is about 10° C.

Aspects of the subject matter described herein may be useful alone or in combination with one or more other aspects described herein. In an aspect of the present disclosure, a visual warming indicator includes a housing having a first cavity and a second cavity, a masking layer positioned in the first cavity and configured to overlay an indicia located adjacent to the first cavity, and an activation material disposed within the second cavity. The masking layer is configured to visibly mask the indicia when the activation material is in a non-activated state in the first cavity. Additionally, upon warming to an activation threshold, the activation material is configured to transition from the non-activated state to an activated state thereby flowing onto the masking layer and causing the masking layer to transition from an obscuring form to a non-obscuring form, thereby visibly revealing the indicia when the masking layer is in the non-obscuring form.

In another aspect of the present disclosure, which may be used in combination with any other aspect or combination of aspects listed herein, the activated sate is a liquid state, a fluid state, a viscous state, a flowable state or a combination thereof. Additionally, the non-activated state is a solid state.

In another aspect of the present disclosure, which may be used in combination with any other aspect or combination of aspects listed herein, the masking insert is a first masking layer. The indicator further includes a second layer configured to be positioned in the second cavity.

In another aspect of the present disclosure, which may be used in combination with any other aspect or combination of aspects listed herein, the activation material is disposed on the second layer.

In another aspect of the present disclosure, which may be used in combination with any other aspect or combination of aspects listed herein, the indicia is provided on a film that is (i) coupled to a back side of the masking layer, (ii) coupled to the bottom portion of the first cavity, or (iii) positioned under the first cavity.

In another aspect of the present disclosure, which may be used in combination with any other aspect or combination of aspects listed herein, the film is a colored laminate film.

In another aspect of the present disclosure, which may be used in combination with any other aspect or combination of aspects listed herein, the indicia includes a color, a dataform or a combination thereof.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, the masking layer comprises a light scattering material.

In another aspect of the present disclosure, which may be used in combination with any other aspect or combination of aspects listed herein, the masking layer is made from a Polytetrafluoroethylene (PTFE) material.

In another aspect of the present disclosure, which may be used in combination with any other aspect or combination of aspects listed herein, the PTFE material is an opaque PTFE material that is in the obscuring form prior to being contacted by the activation material.

In another aspect of the present disclosure, which may be used in combination with any other aspect or combination of aspects listed herein, the activation material is a meltable material, which has a predetermined melting point.

In another aspect of the present disclosure, which may be used in combination with any other aspect or combination of aspects listed herein, the activation material includes a polymer having side chain crystallinity (SCC), a meltable solid, an alkane, an alkyl ester, a wax, a glycol, an adipate, a sebacate, a terephthalate, a dibenzoate, a gluterate, a phthalate, an azelate dispersed in a resin-based matrix or combinations thereof.

In another aspect of the present disclosure, which may be used in combination with any other aspect or combination of aspects listed herein, the non-obscuring form of the masking layer persists after the activation material transition from the activated state back to the non-activated state.

In another aspect of the present disclosure, which may be used in combination with any other aspect or combination of aspects listed herein, the masking layer is configured to visibly mask the indicia by obscuring visibility of the indicia until the masking layer reaches a saturation threshold of activation material.

In another aspect of the present disclosure, which may be used in combination with any other aspect or combination of aspects listed herein, the activation threshold is one of (i) a predetermined cumulative heat exposure threshold, (ii) a predetermined peak heat exposure threshold, and (iii) a time-temperature exposure threshold.

In another aspect of the present disclosure, which may be used in combination with any other aspect or combination of aspects listed herein, the peak heat exposure threshold is a peak temperature exposure in a range from about 0° C. to about 65° C., from about 0° C. to about 50° C., from about 0° C. to about 40° C., from about 0° C. to about 30° C., from about 0° C. to about 20° C., from about 0° C. to about 10° C., from about 10° C. to about 65° C., from about 15° C. to about 65° C., from about 25° C. to about 65° C., from about 35° C. to about 65° C., from about 45° C. to about 65° C., from about 0° C. to about 15° C., from about 5° C. to about 15° C., from about 15° C. to about 25° C., from about 25° C. to about 35° C., from about 35° C. to about 45° C., from about 5° C. to about 10° C., from about −20° C. to about 0° C., from about −20° C. to about −15° C., from about −20° C. to about −10° C., from about −20° C. to about −5° C.

In another aspect of the present disclosure, which may be used in combination with any other aspect or combination of aspects listed herein, the peak heat exposure threshold is about 10° C.

In another aspect of the present disclosure, which may be used in combination with any other aspect or combination of aspects listed herein, the peak heat exposure threshold is about 6° C.

These and other features are disclosed in greater detail in the accompanying figures and the Detailed Description below.

DETAILED DESCRIPTION

Figure 1:
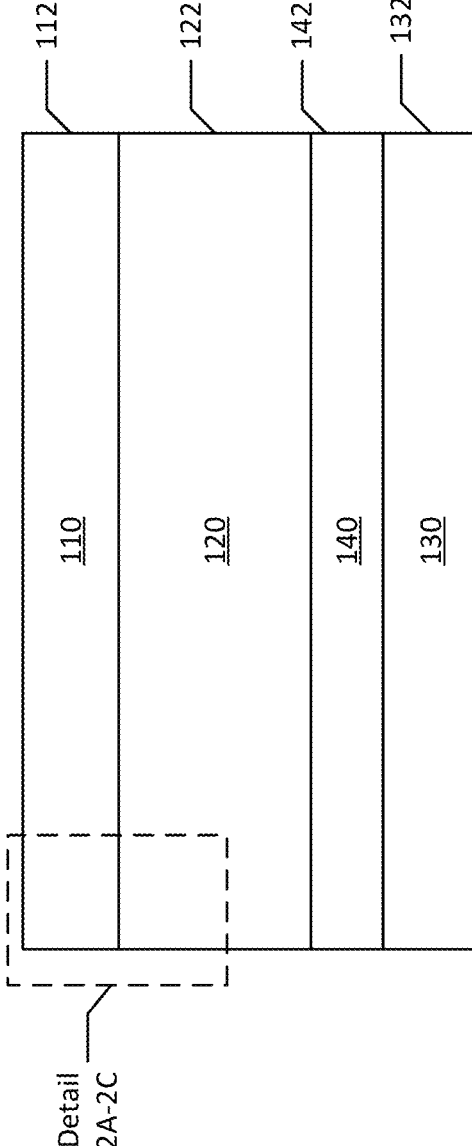
FIG. 1 illustrates a perspective view of an environmental exposure indicator according to an example of the present disclosure.

In some circumstances colorants or color changing materials used in a threshold temperature exposure indicator, even if captured in a normally solid state material, can diffuse or leak over time resulting in false positive results, shortening the effective useful life of an indicator or the apparent life of a host product. Moreover, color changing materials can be complex to manufacture in a controlled way. Some example embodiments described in the present disclosure allow the manufacture of a threshold temperature exposure indicator that uses a melting solid, without the necessity of including a colorant or dye with the melting solid.

A need exists for an environmental indicator, such as a peak temperature indicator, that monitors one or more modes of environmental exposure of the environmental indicator or a host product that the environmental indicator is attached to without the use of dyes, color-changing materials, or other colorants in the temperature sensitive indicator material. In an example, the environmental indicator may be responsive to an environmental exposure, such as cumulative ambient heat exposure, peak ambient heat exposure and exposure to a specific temperature, e.g., a temperature above a predetermined threshold of interest. Some prior temperature exposure indicators that change color state in response to temperature exposure above or below a threshold temperature, utilize one or more dyes or colorants as an indicator that heat exposure has reached a predetermined threshold temperature. However, indicators using dyes and colorants may require complex formulations of activation material that require extensive production times. Furthermore, dyes and colorants may be relatively unstable at certain temperatures and may not produce consistent results. Additionally, dyes and colorants may be expensive and increase product costs.

To improve stability, simplify production and reduce product costs, an environmental indicator, such as a peak temperature indicator that facilitates an observable state change by obscuring and revealing an indicia (e.g., color) is provided herein. The techniques and indicators disclosed herein change state in response to an environmental exposure, such as a temperature exposure, without the use of dyes in or otherwise released by the temperature sensitive indicator material.

The present disclosure includes an environmental indicator or monitor for monitoring a predetermined environmental exposure, e.g., a predetermined heat exposure such as a predetermined cumulative ambient heat exposure and/or a predetermined peak ambient heat exposure.

As used herein, the terms "threshold" and "threshold temperature" have their normal meaning in the art and include a temperature, usually a temperature above 0° C. (though temperatures below 0° C. are also contemplated), that can cause damage or harm to a product, such as a food or a vaccine that generally requires refrigeration to avoid spoilage or maintain efficacy for extended periods. The term "threshold temperature," then, can be any predetermined temperature that is above a desired storage temperature of a perishable product.

As used herein, the term "activation component" refers to a material or combination of materials working together such that at least a portion of the "activation component" is configured to transition a "light scattering material (LSM)" from an "obscuring form" to a "non-obscuring form". In one example, the "activation component" may be the "activation material" described below. In another example, the "activation component" may include a "retaining component" and the "activation material". The "activation component" may be formulated as an "activation material" encapsulated or trapped within a "retaining component" matrix. Furthermore, the "activation component" may be arranged as a reservoir of "activation material" retained by a layer or plug of the "retaining component".

As used herein, the term "retaining component" refers to a component, such as a layer of material or an encapsulating layer that retains the "activation material" until a specified environmental condition is met. In an example, the "retaining component" may be a "meltable material" that is adapted, once activated, to release the "activation material" thereby allowing the "activation material" to flow through the "LSM" thereby filling voids associated with the "LSM" and transitioning the "LSM" to the "non-obscuring form".

As used herein, the term "activation material" refers to a material configured to transition a "light scattering material (LSM)" from an "obscuring form" to a "non-obscuring form". The "activation material" may be a "meltable material" that is adapted, once activated, to flow through the "LSM" thereby filling voids associated with the "LSM" and transitioning the "LSM" to the "non-obscuring form".

As used herein, the term "light scattering material (LSM)" refers to a material configured to scatter incident light. As described in more detail below, the "LSM" may be in an "obscuring form" or a "non-obscuring form". Additionally, the "LSM" is porous and may include "voids" that are adapted to allow the "activation material" to flow through the "LSM" and at least partially fill the "voids". When the "LSM" reaches a predetermined saturation with the "activation material", the "LSM" transitions from the "obscuring form" to the "non-obscuring form". One example of an "LSM" is a "cavitated material".

As used herein, the term "void" or "voids" refers to empty or vacant spaces in the material, including cavities, pores, or the like within the material (e.g., LSM) or on the material's surface. Additionally, "voids" refers to valleys or indentions on a textured surface or rough surface of the material (e.g., LSM).

As used herein, the term "non-activated state" refers to a state of the "activation material" such that the "activation material" is unable to convert "LSM" to an "obscuring form". In an example, the "non-activated state" may be a solid state or a state with sufficient viscosity such that the "activation material" resists motion and is unable to flow onto and through the "LSM".

As used herein, the term "activated state" refers to a state of the "activation material" such that the "activation material" is adapted to convert "LSM" to the "obscuring form". In an example, the "activated state" may be a fluid state or a state with a low enough viscosity such that the "activation material" is adapted to flow onto and through the "LSM" thereby transitioning the "LSM" from the "obscuring form" to the "non-obscuring form".

As used herein, the term "obscuring form" refers to a form of the "LSM" where the material obscures an underlying indicia. For example, when in the "obscuring form", the "LSM" may be non-transparent, translucent, opaque or otherwise configured to obscure viewing or reading of an underlying indicia. Even though the "LSM" may be translucent, thereby allowing some light to pass through the "LSM" when in the "obscuring form", the level of translucence is low enough (e.g., more similar to opaque than transparent) such that the underlying indicia is obscured. Specifically, if the indicia is a machine-readable symbol, such as a barcode symbol, the machine-readable symbol is unreadable when the "LSM" is in the "obscuring form". If the indicia is a color, the color is undecipherable when the "LSM" is in the "obscuring form". If the indicia is a dataform, such as a word, the dataform is unreadable or undecipherable when viewed through the "LSM" when the "LSM" is in the "obscuring form".

As used herein, the term "non-obscuring form" refers to a form of the "LSM" where the material does not obscure the underlying indicia, such that the indicia may be accurately identified. For example, when in the "non-obscuring form", the "LSM" may be transparent, translucent or otherwise configured to allow accurate identification (e.g., viewing, reading, interpreting, etc.) of the underlying indicia. Even though the "LSM" may be translucent, thereby allowing some—but not all—light to pass through the "LSM" when in the "non-obscuring form", the level of translucence is high enough (e.g., more similar to transparent than opaque) such that the underlying indicia is not obscured and is instead viewable or readable. Specifically, if the indicia is a machine-readable symbol, such as a barcode symbol, the machine-readable symbol is readable when the "LSM" is in the "non-obscuring form". If the indicia is a color, the color is identifiable and decipherable when the "LSM" is in the "non-obscuring form". If the indicia is a dataform, such as a word, the dataform is readable when viewed through the "LSM" when the "LSM" is in the "non-obscuring form".

As used herein "deployed orientation" refers to an orientation of an environmental exposure indicator where the indicator is configured to indicate a response to a specified environmental exposure. For example, in the "deployed orientation" the environmental exposure indicator may be applied to a product and oriented in such a fashion such that the "activation material" and the "LSM" can interact with each other.

As used herein "non-deployed orientation" refers to an orientation of an environmental exposure indicator where the indicator is unable to indicate a response to a specified environmental exposure. For example, in the "non-deployed orientation" the environmental exposure indicator may still be separate from (e.g., not applied to) a product. Additionally, in the "non-deployed orientation" the environmental exposure indicator may be oriented in such a fashion that the "activation material" and the "LSM" are prevented from interacting with each other.

Environmental Indicator

FIG. 1 illustrates an example environmental exposure indicator 100. The environmental exposure indicator 100 may be sensitive to temperature changes and may be referred to as a temperature exposure indicator. Specifically, when the environmental exposure indicator 100 is configured such that the indicator is sensitive to temperature exposure, the environmental exposure indicator 100 may be referred to as a temperature exposure indicator 100. However, it should be appreciated that any structure(s) or function(s) described herein in relation to a temperature exposure indicator 100 may also apply more generally to an environmental exposure indicator 100, responsive to other environmental stimuli that cause a state change in an activation material, e.g., radiation, humidity, light, and other forms of environmental exposure. For example, a temperature exposure indicator 100 may be discussed as one illustrative example of an environmental exposure indicator 100, but any illustrations or descriptions associated with either embodiment (e.g., environmental exposure or temperature exposure) may apply to the other embodiment. Furthermore, as used herein, an environmental exposure indicator 100 or a temperature exposure indicator 100 may be generally referred to as indicator 100.

The temperature exposure indicator 100 includes an activation material (e.g., a meltable material), a light scattering material and an indicia. Optionally, the temperature exposure indicator 100 may also include a boundary between the light scattering material and the indicia. In the illustrated example, the temperature exposure indicator 100 includes a layer 112 of activation material 110, which may be formulated as meltable material that changes state upon melting. In other examples, the activation material 110 may change states (e.g., becoming less viscous, becoming more flowable, transitioning from a solid to a liquid) in other ways than melting and in response to other environmental stimuli. The activation material 110 may also be provided in a reservoir, which is described in more detail with relation to FIGS. 8A-8C and FIGS. 9A and 9B.

The indicator 100 may also include a light scattering material 120, which may be provided as a layer 122 overlaying an indicia 130. The light scattering material (LSM) 120 may also be provided as an insert (see FIG. 8C) that is positioned over an indicia 130, obscuring the indicia when the light scattering material is in its original deployed orientation. The light scattering material 120 is porous or otherwise includes voids that are adapted to allow the activation material 110 to flow through the light scattering material 120 to fill the voids thereby transitioning the light scattering material 120 from an obscuring form to a non-obscuring form.

The activation material 110, when formulated as a meltable material responsive to an environmental stimuli of heat or temperature, may have a melting point at an activation threshold of the temperature exposure indicator 100. As noted above, the indicator 100 may be sensitive to other types of environmental exposure, such that the activation material 110 changes state at an activation threshold of the type of environmental exposure (e.g., humidity, light, etc.).

The light scattering material 120 may be positioned immediately adjacent to the layer 112 of activation material 110, or alternatively in a position that is at least in fluid communication with the activation material 110. For example, the activation material 110 (e.g., meltable material) may be in direct contact with the light scattering material 120 such that once activated, the activation material 110 (e.g., meltable material) interacts with the light scattering material 120. The interaction between the activation material 110 (e.g., meltable material) and the light scattering material 120 is described in more detail with reference to FIGS. 2A, 2B and 2C.

The indicator 100 also includes an indicia 130. As illustrated in FIG. 1A, the indicia 130 is overlayed by the light scattering material 120 such that the indicia 130 is initially obscured by the light scattering material 120 prior to the activation material 100 (e.g., meltable material) being exposed to a temperature above the activation threshold. As noted above, the activation material 110 (e.g., meltable material) may be in direct contact with the light scattering material 120. Specifically, the activation material 110, which may be provided as a layer 112 (see FIG. 1) or in a reservoir (see FIG. 8A), is in fluid communication with the light scattering material 120, such that the activation material 110, when exposed to a temperature at or above the activation threshold, is configured to melt and flow into the voids of the light scattering material 120 thereby causing the light scattering material 120 to transition from an obscuring form (see FIG. 2A) to a non-obscuring form (see FIG. 2C).

When the light scattering material 120 is in the obscuring form, visibility of the underlying indicia 130 may be partially or completely obscured. Conversely, when the light scattering material 120 is in the non-obscuring form, the indicia 130 is viewable or decipherable through the light scattering material 120. In some examples, a sealing material 140 may optionally be provided as a boundary layer or a sealing layer 142 to create a boundary between the light scattering material 120 and the indicia 130 to prevent the activation material 110 from interacting with (e.g., flowing on, staining or obstructing) the indicia 130. Depending on the materials and formulation of the indicia 130, the sealing layer 142 may be unnecessary. However, in instances where the indicia 130 may be degraded or otherwise negatively affected by exposure to the activation material 110, the indicator 100 may advantageously include the sealing layer to prevent such exposure.

One or more indicia 130 may be provided in an indicia layer 132. The indicia layer 132 may include different types of indicia 130, e.g., a color (e.g., a solid color) or a dataform, e.g., a machine readable symbol, such as a barcode symbol.

Figures 2A, 2B, 2C:
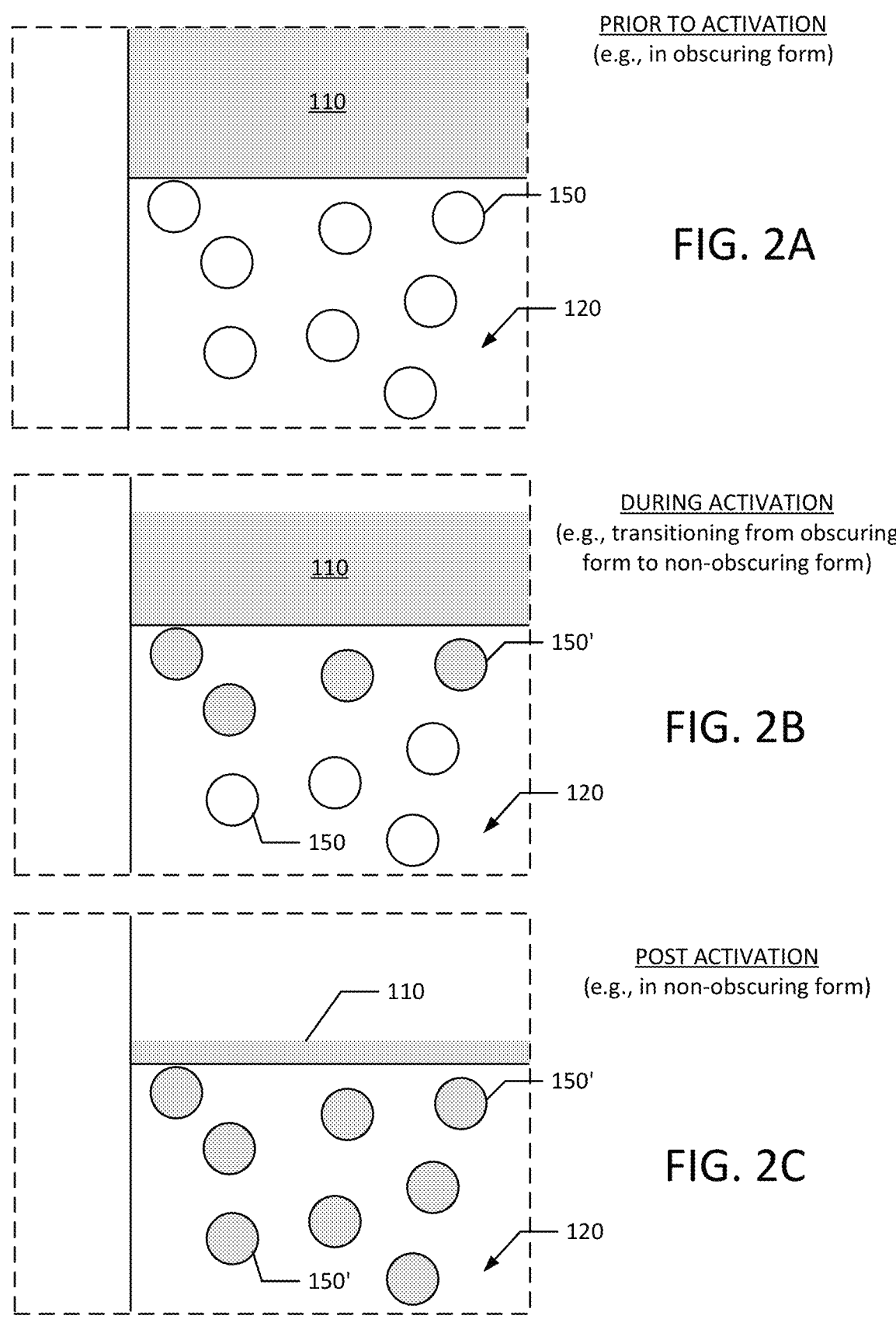
FIG. 2A illustrates a detailed view of an environmental exposure indicator, prior to activation, according to an example of the present disclosure.
FIG. 2B illustrates a detailed view of an environmental exposure indicator, during activation, according to an example the present disclosure.
FIG. 2C illustrates a detailed view of an environmental exposure indicator, post activation, according to an example of the present disclosure.

FIG. 2A illustrates a detailed view of the indicator 110 of FIG. 1, prior to activation. As illustrated in FIG. 2A, the light scattering material 120 may include a plurality of voids 150. Initially, prior to activation, the voids 150 may be configured to scatter light passing through the light scattering material 120. As used herein, "scattering" may describe a wide range of physical processes where moving particles (e.g., photons) or radiation of some form (e.g., light), is forced to deviate from a straight trajectory by localized non-uniformities (including particles or voids 150) in the medium through which they pass. Deviations in the trajectory may also be caused by reflections of radiation (e.g., light). Reflections of radiation that undergo scattering are often called diffuse reflections and unscattered reflections are called specular (mirror-like) reflections. Without being bound to a particular theory, at an atomic level, "scattering" refers to particle-particle collisions between molecules, atoms, electrons, photons and other particles. In the illustrated example, "scattering" may be caused by non-uniformities, such as voids 150, in the light scattering material 120. The non-uniformities may exist on the light scattering material's surface, within the light scattering material 120, or a combination thereof. However, the types of non-uniformities which can cause scattering, sometimes known as "scatterers" or "scattering centers", may include particles, bubbles, droplets, density fluctuations in fluids, crystallites in polycrystalline solids, defects in monocrystalline solids, surface roughness, cells in organisms, textile fibers in clothing among others. The effects of such features on the path of almost any type of propagating wave or moving particle can be described in the framework of scattering theory. In several of the examples described herein, the "scatterers" are "voids" as define above.

Specifically, when light is passing through the light-scattering material 120 in the obscuring form, the voids 150 (along with other non-uniformities) may cause the light to deviate from a straight trajectory and the aggregate effect of each instance of scattering causes the light-scattering material 120 to be non-transparent or opaque thereby obscuring the indicia 130 positioned beneath the material. When the indicator 100 is in the obscuring form (e.g., has not yet been exposed to a temperature at or above the activation threshold), the activation material or meltable material remains in a non-activated state (e.g., a solid state) and does not flow into the voids 150 of the light scattering material 120 such that the light scattering material 120 retains its light scattering properties. Specifically, prior to activation, the light scattering material 120 is in an obscuring form and remains in an obscuring form until the activation material 110 is activated (e.g., starts melting) and flows into the voids 150 (illustrated in FIG. 2B) thereby eventually transitioning the light scattering material 120 to a non-obscuring form thereby revealing the indicia 130 as illustrated in FIG. 2C. It should be appreciated that when the light scattering material 120 is in an obscuring form, the indicia 130 is obscured from a viewer. In some cases, the viewer may be unable to see any of the indicia 130 when the light scattering material is in the obscured sate. In other examples, the light-scattering material may partially obscure the indicia 130, such that the view is unable to decipher the indicia 130. The indicia 130 may be completely obscured (e.g., not visible) or partially obscured when viewing the indicia 130 through the light scattering material 120.

In the obscuring form, the light scattering material 120 may be opaque thereby blocking light from traveling through the layer of material. In another example, in the obscuring form, the light scattering material 120 may be translucent, allowing some light to travel through the layer of material while blocking enough light to obscure the readability of the indicia 130.

FIG. 2B illustrates a detailed view of the indicator 110 of FIG. 1 during activation (e.g., as the activation material 110 is at least partially in an activated state and is starting to transition the light scattering material 120 from an obscuring form to a non-obscuring form). FIG. 2C illustrates a detailed view of the indicator 110 of FIG. 1 post activation (e.g., after the light scattering material 120 is saturated with enough activation material 110 to transition the light scattering material 120 to the non-obscuring form). As illustrated in FIGS. 2B and 2C, the activation material 110 (e.g., meltable material) is in fluid communication (and more specifically in this example, in fluid contact) with the light scattering material 120. When exposed to an activation event (e.g., a temperature) at or above the activation threshold, the activation material 110 (e.g., meltable material) is configured to flow into the voids 150 of the light scattering material 120. As a function of the activation material 110 flowing into the voids 150 of the light scattering material 120, the light scattering material 120 transitions from an obscuring form to a non-obscuring form so that the indicia 130 is viewable or decipherable through the light scattering material 120. As the activation material 110 flows into the voids 150 of the light scattering material 120, the level of the activation material 110 in the layer 112 of activation material 110 decreases. As illustrated in FIG. 1C, void(s) 150 filled with the activation material 110 (e.g., meltable material) are depicted as void 150'.

As the voids 150' are filled, the light scattering properties of the light scattering material 120 diminish. Specifically, the presence of the activation material (e.g., meltable material) within the voids 150' changes the material properties of the light scattering material 120 such that the material allows enough light to pass through to make the indicia 130 viewable or decipherable to a viewer. Similar to FIG. 1B, the continued flow and filling of the voids 150' by the activation material 110 further reduces the level of the layer 112 of activation material as illustrated in FIG. 1C. Specifically, as the activation material 110 fills the voids 150' the height or thickness of the layer 112 of the activation material 110 becomes smaller.

In the non-obscuring form, the light scattering material 120 may be transparent essentially allowing all light to traveling through the layer of material. In another example, in the non-obscuring form, the light scattering material 120 may be translucent, blocking some light to travel through the layer of material while allowing enough light through the material such that the indicia 130 is readable or decipherable from a viewer.

In an example, the non-obscuring form of the light scattering material 120 persists after the activation material (e.g., meltable material) re-solidifies at a temperature below the activation threshold. For example, the meltable material may be configured to solidify within the voids 150' of the light scattering material 120 upon return to a temperature below the activation threshold. Upon solidification, the light scattering material 120 may remain in the non-obscuring form illustrated in FIG. 2C. In another example, upon solidification, the light scattering material 120 may return to the obscuring form illustrated in FIG. 2A.

Figure 3A:
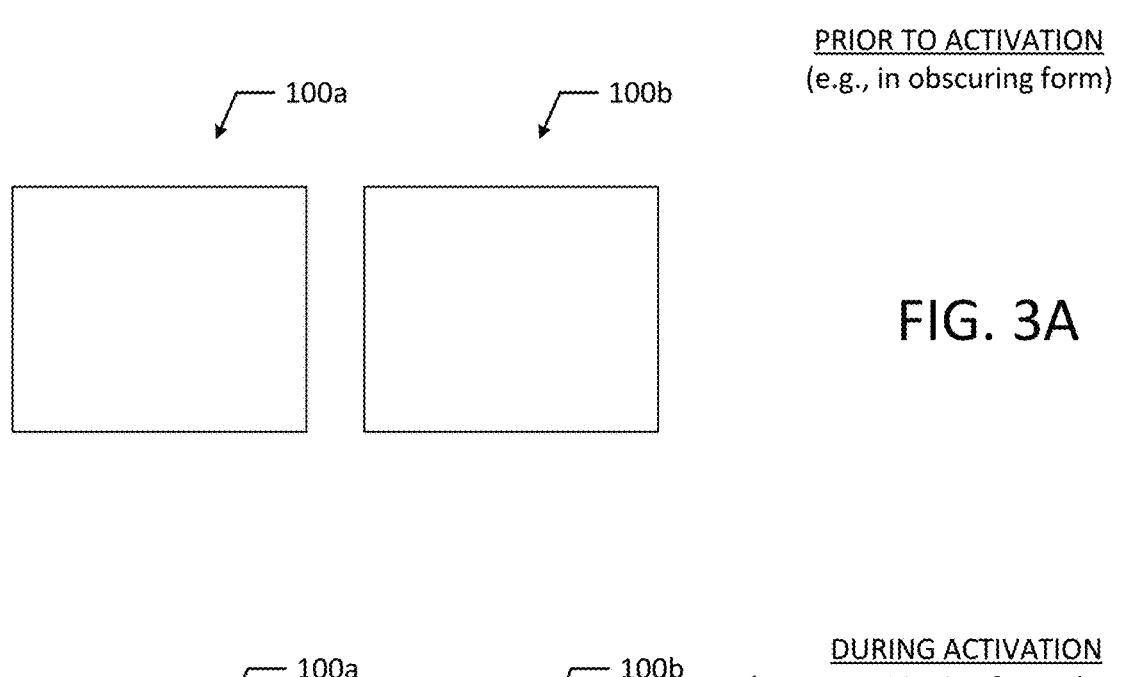
FIG. 3A illustrates various examples of an environmental exposure indicator, prior to activation, according to examples of the present disclosure.
Figure 3B:
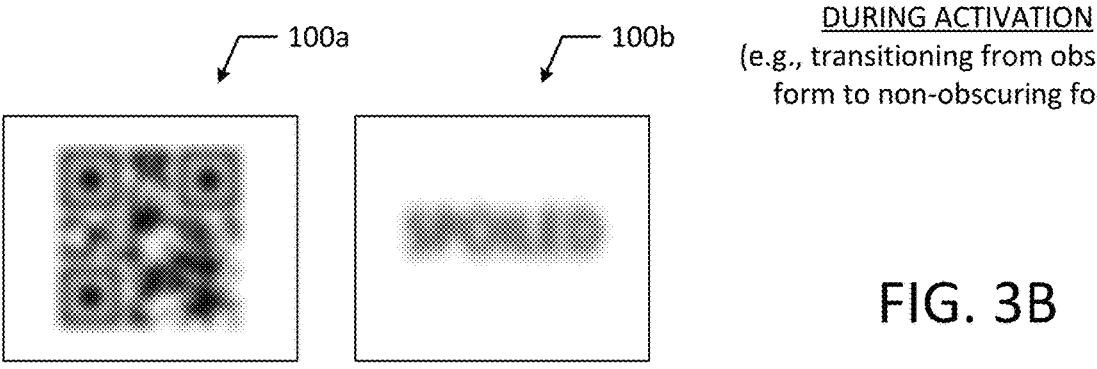
FIG. 3B illustrates various examples of the environmental exposure indicators of FIG. 3A, during activation, according to examples of the present disclosure.
Figure 3C:
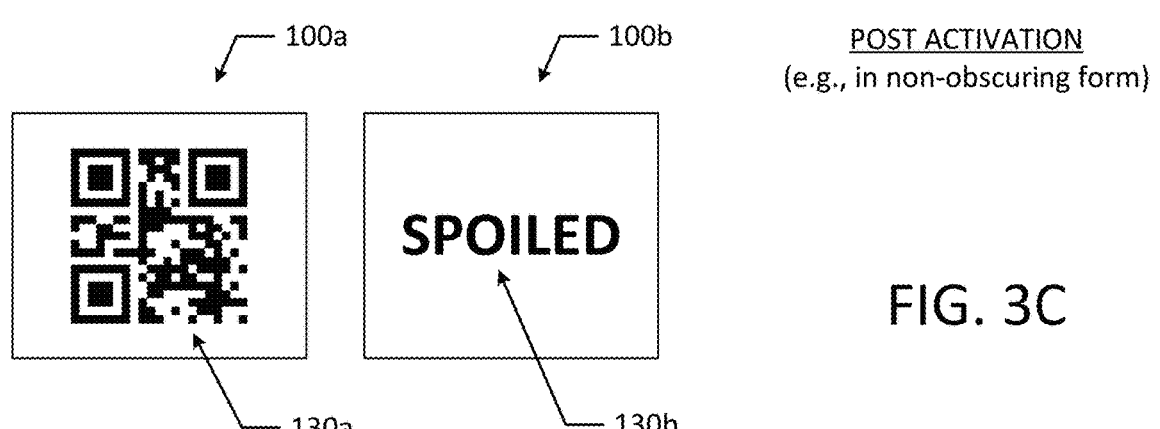
FIG. 3C illustrates various examples of the environmental exposure indicators of FIGS. 3A and 3B, post activation, according to examples of the present disclosure.

FIGS. 3A, 3B and 3C illustrate examples of an environmental exposure indicator 100 as the light scattering material 120 transitions from an obscuring form (e.g., where the indicia 130 is obscured) to a non-obscuring form (e.g., where the indicia 130 is identifiable). In one example, the indicia 130 (e.g., indicia 130a) is a machine-readable symbol, such as a 2D barcode symbol. In the other example, the indicia 130 (e.g., indicia 130b) is a word (e.g., "SPOILED").

FIG. 3A illustrates environmental exposure indicators 100a and 100b prior to activation with the light scattering material 120 in an obscuring form. In the illustrated example, the light scattering material 120 remains in an obscuring form until the activation material 110 is activated (e.g., starts melting) and flows into the voids 150 (illustrated in FIG. 2B). When the light scattering material 120 is in the obscuring form, the indicia (e.g., indicia 130a and 130b in FIG. 3C) is not visible through the light scattering material 120.

FIG. 3B illustrates environmental exposure indicators 100a and 100b during activation (e.g., as the activation material 110 starts to transition from a non-activated state to an activated state) where the light scattering material 120 begins transitioning from the obscuring form to the non-obscuring form. In an example, the environmental exposure indicator 100a includes a machine-readable symbol, such as a 2D barcode symbol as the indicia 130a (see FIG. 3C). In another example, the environmental exposure indicator 100b includes a word as the indicia 130b (see FIG. 3C). Referring back to FIGS. 2B and 2C, the activation material 110 (e.g., meltable material), when exposed to an activation event (e.g., a temperature) at or above the activation threshold, the activation material 110 (e.g., meltable material) is configured to flow into the voids 150 of the light scattering material 120. As the voids 150' are filled, the light scattering properties of the light scattering material 120 diminish. Specifically, the presence of the activation material (e.g., meltable material) within the voids 150' changes the material properties of the light scattering material 120 such that the material allow more light to pass through, thereby increasing the visibility of the indicia (e.g., indicia 130a and 130b). As illustrated in FIG. 3B, the indicia is still obscured such that the barcode (e.g., indicia 130a of FIG. 3C) is unreadable and the word "SPOILED" (e.g., indicia 130b of FIG. 3C) is unreadable. Because the activation material 110 has not yet flowed into a sufficient amount of the voids 150, the light scattering properties of the light scattering material 120 still prevent the indicia from being discerned as illustrated in FIG. 3B. However, as the light scattering material 120 becomes more saturated with the activation material 110, eventually enough light is able to pass through the light scattering material 120 such that the indicia (e.g., indicia 130a and 130b) is viewable or decipherable to a viewer, as illustrated in FIG. 3C FIG. 3C illustrates environmental exposure indicators 100a and 100b post activation where the light scattering material 120 is in the non-obscuring form. Referring back to FIGS. 2B and 2C, as a function of the activation material 110 flowing into the voids 150 of the light scattering material 120, the light scattering material 120 transitions from an obscuring form to a non-obscuring form. In the non-obscuring form, the barcode (e.g., indicia 130a) and the word "SPOILED" (e.g., indicia 130b) are no longer obscured and are readable or decipherable to a viewer. Once revealed, the barcode (e.g., indicia 130a) may be scanned to indicate that the associated product is expired or spoiled. Additionally, by revealing the word "SPOILED" (e.g., indicia 130b) a user may be informed that the associated product experienced a peak temperature above safe storage levels and the product is now spoiled.

Figure 4A:
FIG. 4A illustrates an environmental exposure indicator, according to an example the present disclosure.
Figure 4A:
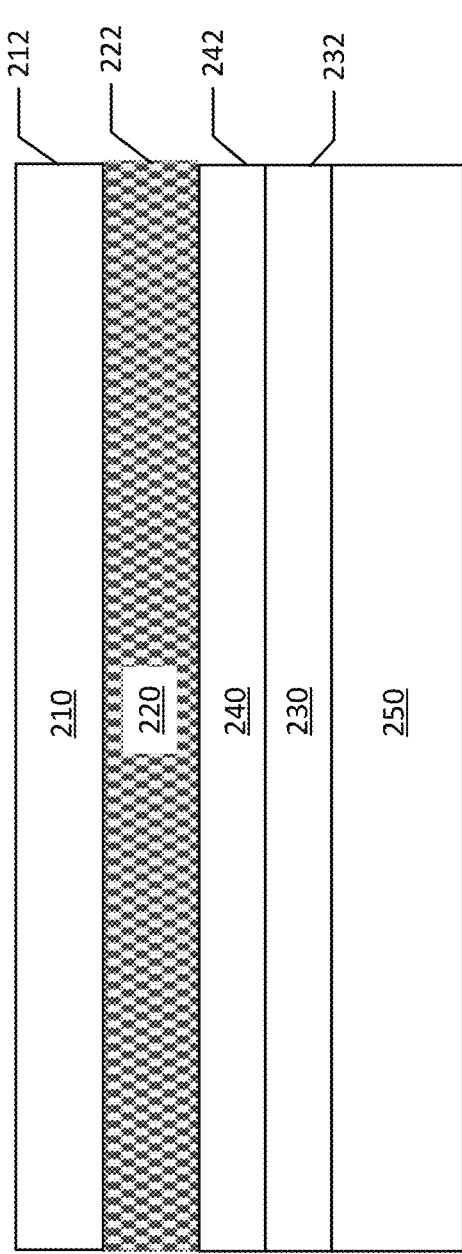

FIG. 4A illustrates an example environmental exposure indicator 200. Similar to indicator 100, the environmental exposure indicator 200 may be sensitive to temperature changes and may be referred to as a temperature exposure indicator 200. Specifically, when the environmental exposure indicator 200 is configured such that the indicator is sensitive to temperature exposure, the environmental exposure indicator 200 may be referred to as a temperature exposure indicator 200. However, it should be appreciated that any structure(s) or mechanisms(s) described herein in relation to a temperature exposure indicator 200 may also apply more generally to an environmental exposure indicator 200. For example, the activation material may be responsive to changes in moisture or humidity, such that upon exposure to a predetermined level of moisture or humidity, the activation material transitions from a non-activated state to an activated state. Specifically, the increase in humidity may provide enough moisture to the activation material, thereby hydrating the activation material such that the activation material becomes more flowable and is capable of flowing onto and through the light scattering material. In other examples, the activation material may be a matrix bound or a microencapsulated activation material. For example, the activation material may be released and become flowable in response to shock, vibrations or pressure that releases the activation material from the bound matrix or microencapsulations. Some other examples may include activation materials that are sensitive to or activated based on changes in pH, light exposure (e.g., photochromic activation materials), etc. Additionally, environmental exposure indicator 200 or temperature exposure indicator 200 may be generally referred to herein as indicator 200.

The indicator 200 may include an activation material 210, a light scattering material 220, an indicia 230 and a substrate 250. The light scattering material 220 may be a cavitated material. Additionally, the indicator 200 may include a sealing material 240 arranged in a boundary layer or a sealing layer 242, which may be provided to create a boundary between the cavitated material 220 and the indicia 230 to prevent the activation material 210 from interacting with (e.g., flowing on, staining or obstructing) the indicia 230. The substrate 250 may be a base layer, such as a film, paper stock, other printable media, etc. In an example, an opaque base layer is provided as a substrate 250.

In the illustrated example, the indicator 200 utilizes flow of an activation material 210 (e.g., arranged in an activation layer 212) into a light scattering material 220 (e.g., arranged in a light scattering material layer). The light scattering material 220, which may be arranged in a LSM layer 222, may have similar properties as the light scattering material 120 described above with reference to FIG. 1 and FIGS. 2A-2C. Similarly, the activation material 210, which may be arranged in an activation layer 212, may have similar properties as the meltable material 110 of FIG. 1 and FIGS. 2A-2C. For example, in response to the indicator 200 being exposed to a temperature at or above the activation threshold, the activation material 210 (e.g., a meltable material) is configured to melt and flow into the voids of the cavitated material 220.

Additionally, indicia 230 may have the same properties as indicia 130 from FIG. 1. In an example, the indicia 230 may be provided as a pigmented layer. The visibility or decipherability of the indicia 230 from a viewer is dependent on whether the activation material 210 (e.g., meltable material) has entered the voids of the light scattering material 220. The light scattering material 220 may be a cavitated material, which has small voids within the material. Some illustrative examples of light scattering material (e.g., LSM 120 or LSM 220) are described in more detail in FIGS. 10A-10D.

For example, the light scattering material 220, which is arranged in a light scattering layer 222 as illustrated in FIG. 4A, has voids such that the LSM layer 222 is (i) non-transparent, opaque or otherwise configured to obscure viewing in an obscuring form and (ii) transparent, translucent or otherwise configured to allow viewing in a non-obscuring form. The indicia 230 is not decipherable or entirely not visible through the LSM layer 222 when the LSM layer is in the obscuring form. Alternatively, the indicia 230 is decipherable or entirely visible through the LSM layer 222 when the LSM layer is in the non-obscuring form. Specifically, the light scattering material 220 (e.g., a cavitated material) may become transparent or translucent thereby allowing the indicia 230 to be read or deciphered by a viewer. In a specific example, the LSM layer 222 is non-transparent in the obscuring form and transparent in the non-obscuring form, such that the indicia 230 is not visible through the light scattering material 220 (e.g., cavitated material) when the light scattering material is in the obscuring form, and such that the indicia 230 is visible through the light scattering material 220 when the LSM 220 is in the non-obscuring form.

As illustrated in FIG. 4A, the LSM 220 is positioned adjacent the indicia 230. Alternatively, a sealing material 240, such as a sealing layer 242, may optionally be positioned between the LSM 220 and the indicia 230. For example, in implementations where the indicia 230 may be negatively from activation material 210 coming into contact with the indicia 230, the sealing material 240 may advantageously prevent the activation material 210 from contacting the indicia 230.

The activation material 210, which may be arranged in an activation layer 212, is in fluid communication with the LSM 220 (e.g., LSM layer 222). For example, the activation material 210 may be in fluid communication with the LSM 220 such that when the activation material 210 starts flowing, the activation material 210 is adapted to flow onto and through (e.g., filling voids) of the LSM 220. In some examples, when materials or layers are in "fluid communication" with each other, the materials or layers may be (i) in direct contact with each other, (ii) bonded together, (iii) adjacent each other without a barrier preventing flow between the materials, or (iv) separated from each other by a gap of air thereby allowing the activation material 210 to flow onto and through the cavitated material 220, etc. The activation material 210 is configured to flow into the voids of the cavitated material 220 when the activation material 210 is exposed to an activation event at or above an activation threshold, e.g., a temperature exposure above a peak or threshold temperature. As the activation material 210 flows into the voids of the LSM 220, the LSM 220 (e.g., LSM layer 222) transitions from an obscuring form to a non-obscuring form. Specifically, the same porosity and voids that give the LSM 220 its light scattering properties also provide a flow path or allow the activation material 210 to flow through the LSM 220 such that the LSM 220 can transition from the obscuring form to the non-obscuring form.

In some embodiments, the activation event and activation threshold may be temperature dependent. For example, in response to the indicator 200 being exposed to a temperature at or above the activation threshold, the activation material 210 is configured to melt and flow into the voids of LSM 220. In an example, once activated, the activation material 210 may flow along the length of the LSM layer 222. The activation material 210 may also flow or diffuse through the LSM layer 222. A sealing material 240, which may be provided as a seal layer 242 between the LSM layer 222 and the indicia 230 may optionally be provided to prevent the activation material 210 from contacting the indicia 230. Specifically, the seal layer 242 functions to retain the activation material 210 within the LSM layer 220 thereby preventing the activation material 210 from seeping through beyond the seal layer 240.

In an example, the indicator 200 may be provided as a multi-layer film. The multi-layer film may comprise an indicia 230 provided on a base layer or a substrate 250. The indicia 230 may be covered by a LSM layer 222. Upon passing through a media processing device (e.g., a thermal printhead, ultrasound transducer, heated roller, dot matrix mechanism, laser, etc.), patterned energy, such as heat, from the media processing device collapses voids in the LSM layer 222, creating a barrier 260 that inhibits or restricts flow of the activation material 210. In a specific example, the printhead may cause the LSM layer 222 to melt and fill the voids (e.g., collapsing the voids) in the areas targeted by the printhead. In other examples, the media processing device may be a physical impacting device that compresses and collapses voids in the LSM layer 222. Since the voids of the barrier 260 have been collapsed by the patterned heat from the device, the activation material 210 cannot flow into the voids of the LSM layer in the barrier region 260. For example, in response to the indicator 200 being exposed to a temperature at or above the activation threshold, the activation material 210 is configured to melt and flow into the voids of the LSM layer 222, rendering the layer transparent and creating an image by revealing the indicia 230 beneath the LSM layer 222. For example, the indicia 230 may be an image or a colored layer, such as a solid black pigmented layer.

In another example, the indicator 200 may include an activation material 220, arranged in an activation layer 222. The activation material 220 may be sensitive to various types of environmental exposure. In one example, the activation material 220 is a temperature sensitive material (e.g., an alkane or SCC polymer), which when exposed to temperatures above the activation material's 220 melt point, is adapted to flow into voids of the LSM layer 222. It should be appreciated that in addition to a sealing layer 242, the patterned heat process described above may be used to create a barrier 260 to control or restrict flow of the activation material 220. For example, by collapsing voids in the LSM layer 222 with patterned heat, the collapsed areas may form a barrier that prevents the flow of the activation material beyond the barrier.

Figure 4B:
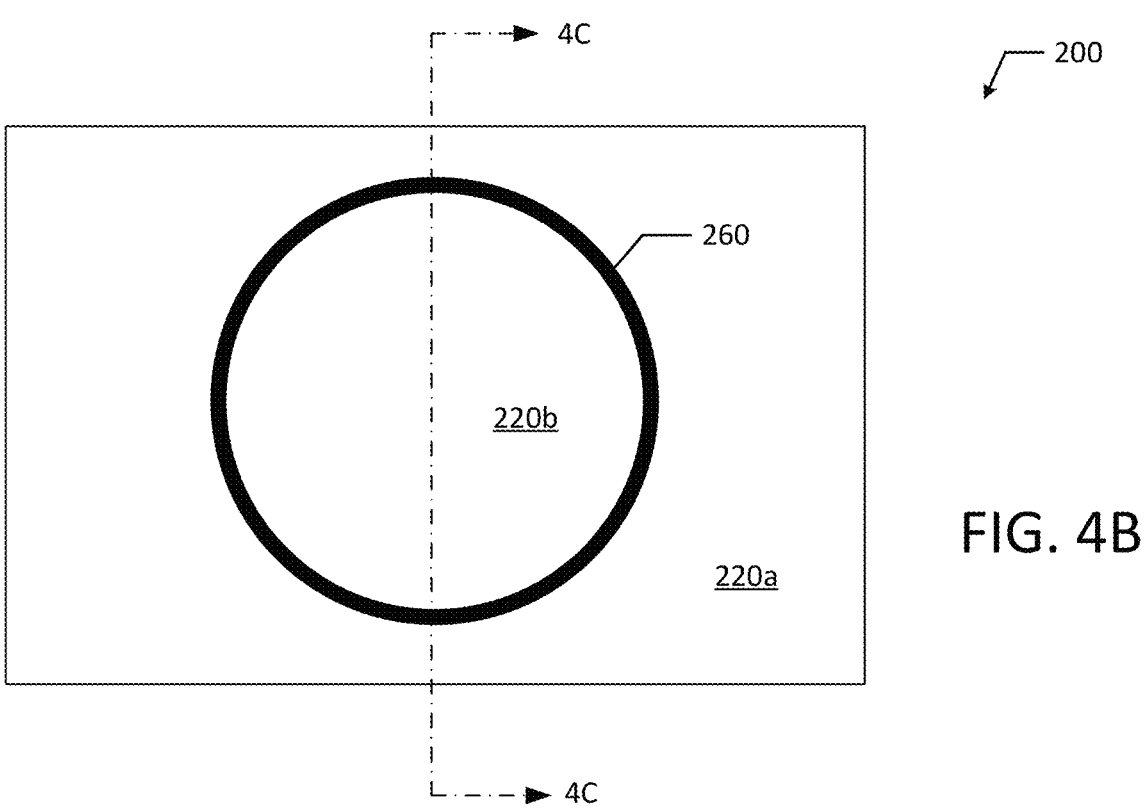
FIG. 4B illustrates an environmental exposure indicator with a boundary, according to an example of the present disclosure.
Figure 4C:
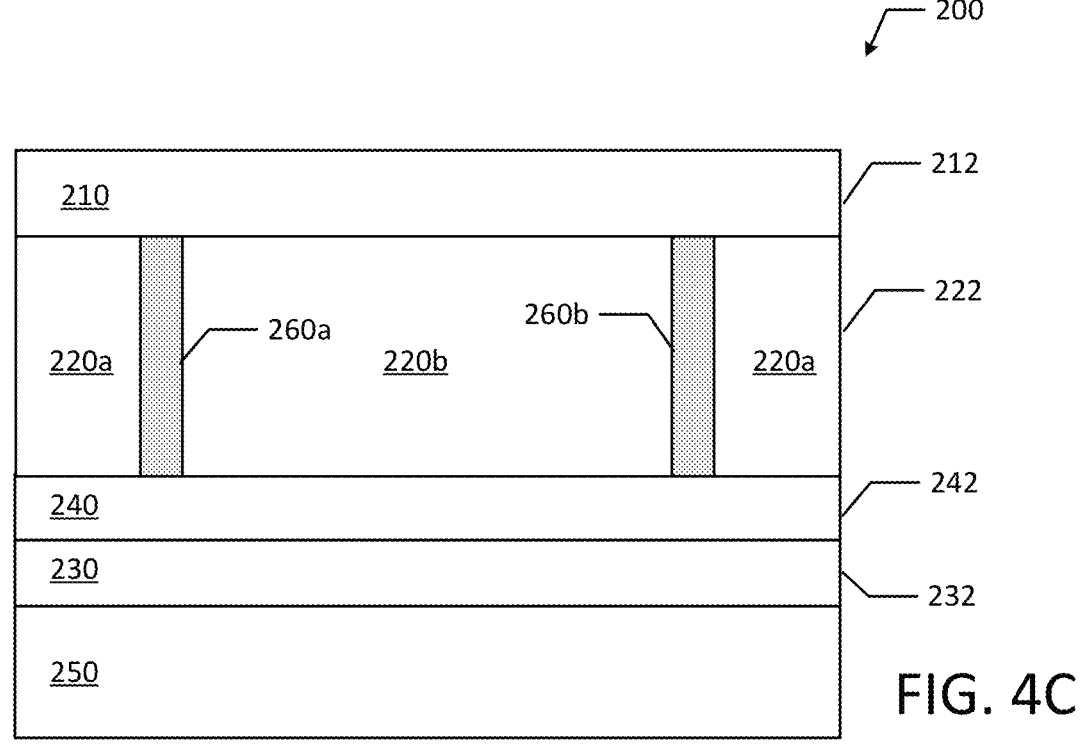
FIG. 4C illustrates a cross-sectional view of the environmental exposure indicator of FIG. 4B, according to an example of the present disclosure.

As illustrated in FIGS. 4B and 4C, the indicator 200 may be patterned with a barrier 260. The barrier 260 may be created by a physical impacting device, direct thermal printing, etc. As discussed above, the barrier 260 may be created by collapsing the voids in the LSM layer 222. FIG. 4B is a top view of the indicator 200 with an imaged barrier 260. As illustrated in FIG. 4C, which as a cross-sectional view along line 4C-4C of FIG. 4B, the boundary 260 includes a first boundary portion 260a and a second boundary portion 260b that extends through the entire LSM layer 222. Each boundary portion 260a and 260b is free of voids and therefore restricts activation material 210 from flowing through the boundary 260 (e.g., activation material 210 is prevented from flowing beyond a boundary portion 260a,b). Therefore, the activation material 210 is free to flow through portions 220a and 220b of the LSM layer 222, but is restricted from flowing through either of the boundary portions 260a and 260b.

Figure 5A:
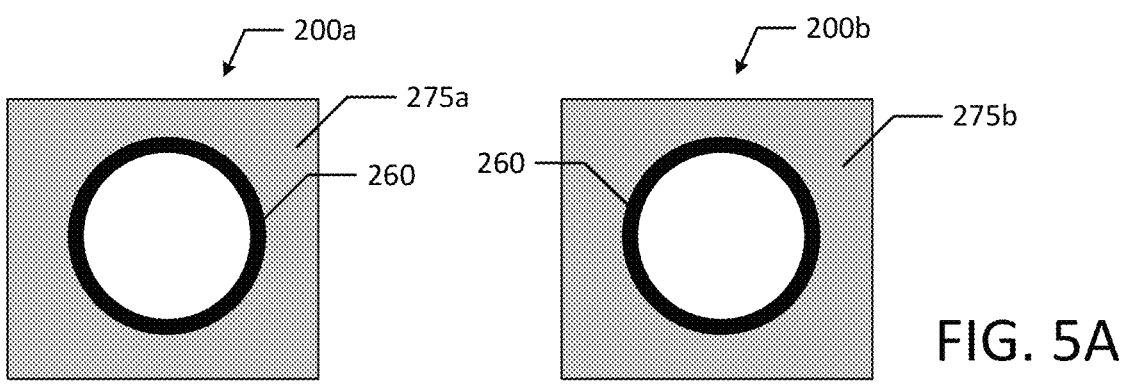
FIG. 5A illustrates various examples of an environmental exposure indicator, prior to activation, according to examples of the present disclosure.

FIG. 5A illustrates two different examples of the indicator 200 patterned with a barrier 260. As illustrated in FIG. 5A, each indicator (200a and 200b) is oriented similar to the view of FIG. 4B and has a layer of activation material 210 followed by a layer of LSM 220 overlaying an indicia within barrier 260. As illustrated in FIG. 5A, each indicia, which in this example is a solid color, is fully obscured as the LSM 220 is in the obscuring form. The indicators (e.g., indicators 200a and 200b) also include a reference region (e.g., reference regions 275a and 275b, hereinafter referred to generally as reference region 275). The reference region 275 may have a color that matches the color of the indicia that is visible through the LSM 220 as the LSM 220 reaches a predetermined level of saturation with the activation material 210. For example, when the indicia 230 is viewed through the LSM 220 and the color of indicia 230 (as viewed through the LSM 220) matches that of the reference region 275, such a match may indicate that the product associated with the indicator 200 has reached its maximum usable life. Specifically, once the color of the indicia 230 (as viewed through the LSM 220) is the same as or darker than the color of the reference region 275, then the associated product is spoiled or expired.

Figure 5B:
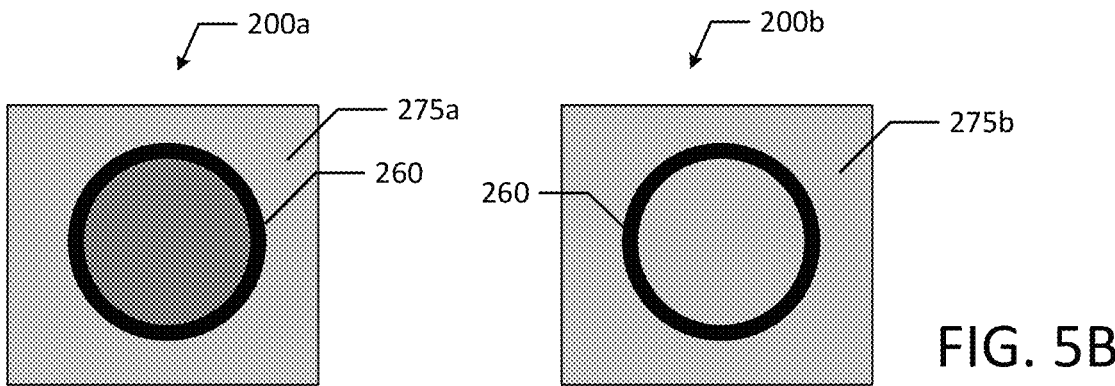
FIG. 5B illustrates various examples of the environmental exposure indicators of FIG. 5A, during activation, according to examples of the present disclosure.
Figure 5C:
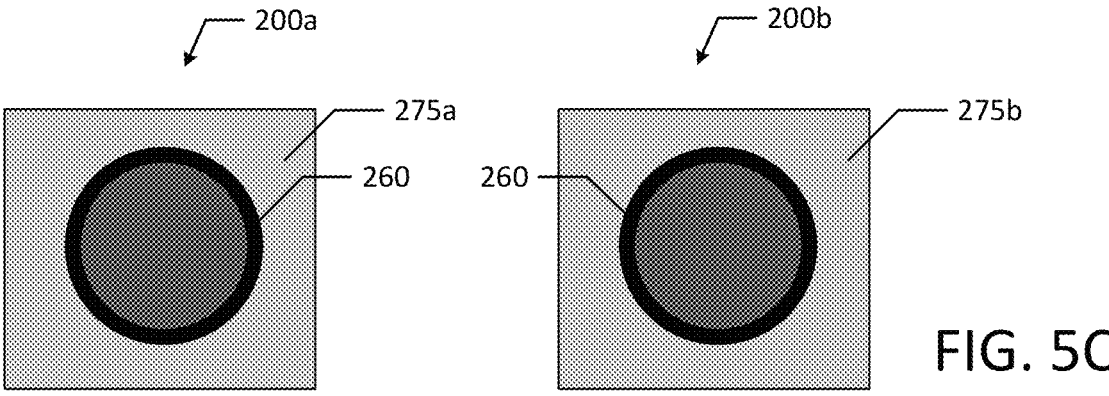
FIG. 5C illustrates various examples of the environmental exposure indicators of FIGS. 5A and 5B, post activation, according to examples of the present disclosure.

The patterned heat from the device collapses voids in the LSM layer 222, creating a barrier 260 that inhibits or restricts flow of the activation material 210. Since the voids of the barrier 260 have been collapsed by the patterned heat, the activation material 210 cannot flow into the voids of the LSM layer in the barrier region 260. The resiliency and permeability of the LSM 220 can be modulated to tailor the progression of the LSM 220 transitioning from an obscuring form to a non-obscuring form. In an example, the thickness of the coating and void size of the LSM 220 in indicator 200a is adjusted to be less resilient. In another example, the indicator 200b the LSM 220 is adjusted to have a greater resiliency. The difference in resiliency is illustrated in FIGS. 5A-5C as each indicator (e.g., indicator 200a and 200b) is exposed to an environmental condition. Specifically, each indicator 200a and 200b may be exposed to the same environmental conditions, and as shown in FIGS. 5A-5C, indicator 200a is more responsive to the environmental exposure than indicator 200b, which is indicated by how quickly the LSM 220 transitions from the obscuring form to the non-obscuring form.

FIG. 5B illustrates the environmental exposure indicator(s) 200a and 200b during activation (e.g., transitioning from the obscuring form to the non-obscuring form). As noted above, the LSM 220 of environmental exposure indicator 200a has been modified to be less resilient. For example, the transition of the LSM 220 from the obscuring form to the non-obscuring form occurs more rapidly due to the lower resiliency and higher permeability of the LSM 220, which may be achieved by modulating structural factors of the LSM 220. In some examples, the resiliency and/or permeability of the LSM 220 may be modulated by altering a coating or varnish on the LSM 220, which may make the LSM more or less permeable. Other approaches of adjusting the resiliency and/or permeability of the LSM 220 include adjusting the size or arrangement of voids in the LSM 220. For example, the LSM 220 may be manufactured by a printer, such as a 3D printer, where the size and arrangement of the voids can be controlled. Decreasing resiliency of the LSM 220 allows the activation material 210 to flow more freely through the LSM 220. In another example, the LSM 220 of environmental exposure indicator 200b has been modified to be more resilient. The increased resiliency reduces the flow rate of the activation material 210 through the LSM 220, which prolongs the transition of the LSM 220 from the obscuring form to the non-obscuring form. In FIG. 5B, the difference in color change between indicator 220a with reduced resiliency and indicator 220b with increased resiliency is notable. Even though the illustrations are provided in grayscale, the indicia 230 is fully obscured in FIG. 5A (shown as white), and the indicia 230 is less obscured in FIG. 5B, where the darker colors represent more of the underlying indicia 230 showing through the LSM 220. In one example, the LSM 220 may be a solid red color where no red color is visible in FIG. 5A, but the red color is decipherable in FIG. 5B. Specifically, the amount of red showing through the LSM 220a is beyond the expiration level for the product and the amount of red showing through the LSM 220b is at the expiration level as shown in FIG. 5B.

FIG. 5C illustrates the environmental exposure indicator (s) 200a and 200b post activation where the LSM 220 is fully transitioned to the non-obscuring form. For example, the transition from the obscuring form to the non-obscuring form occurs more rapidly in indicator 200a due to the resiliency and permeability of the LSM 220 being reduced. As previously noted in FIG. 5B, color change was visible during the progression from the obscuring form to the non-obscuring form in the indicator 200a due to indicator 200a transitioning to the non-obscuring form more rapidly than indicator 200b. The color of the reference regions 275 may be selected and tailored based on the responsiveness of the LSM 220 as well as the underlying color of indicia 230. In an embodiment, the underlying color may be chosen to visually contrast with the LSM layer.

Figures 6A, 6B, 6C, 6D, 6E:
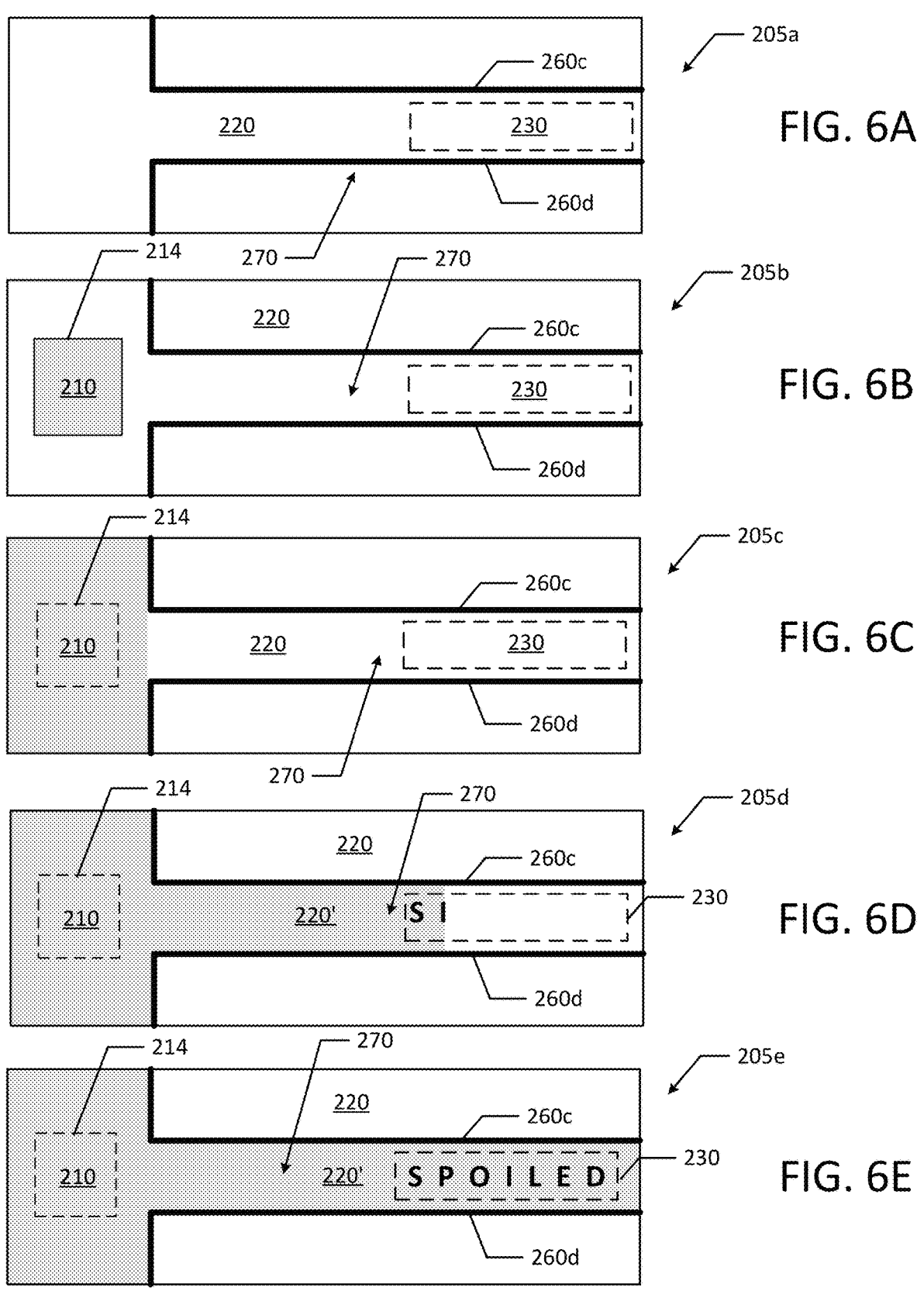
FIGS. 6A, 6B, 6C, 6D and 6E illustrate an environmental exposure indicator at various stages of exposure, according to examples of the present disclosure.

The barrier 260 may be sized and shaped to create a channel or designate a flow path for the activation material 210. For example, referring now to the embodiment illustrated in FIGS. 6A-6E, an indicator 205a may be created with two boundaries 260c and 260d that form a wick or channel 270. As illustrated in FIG. 6A, the light scattering material 220 overlays indicia 230, and since the LSM 220 is in an obscuring form, the indicia 230 is obscured. Then, an activation material 210 may be provided in an activation region 214 (e.g., as a patch of activation material 210 overlaying the cavitated material 220). For example, FIG. 6B illustrates the indicator 205b with the activation region 214 prior to activation and thus the indicia 230 is still obscured. FIG. 6C illustrates the indicator 205c as activation begins and the activation material 210 starts melting and flowing through the voids of the light scattering material 220.

In FIG. 6D, the activation material 210 continues to flow through the voids of the light scattering material 220 and begins to reveal a portion of the indicia 230. For example, as the activation material 210 flows through the light scattering material 220, the light scattering material 220 transitions from an obscuring from to a non-obscuring form. As illustrated in FIG. 6D, the portion of the indicia 230 that is revealed is illustrated as "SI . . . ", but the underlying message is still unclear. In FIG. 6E, the activation material 210 has continued to flow through the voids of the light scattering material 220 while being bounded by boundaries 260c,d. Thus, the activation material 210 flows along the channel and fully transitions the light scattering material to the non-obscuring form 220' thereby revealing the contents of the indicia 130 positioned beneath the channel 270. In the illustrated example, when the full indicia 130 is revealed, which spells "SPOILED", the indicator 205e notifies a user that the contents of the product associated with the indicator 205e are "SPOILED" thereby directing the user to discard the product.

The wicking behavior of the indicator of the LSM 220 can be modified based on the physical characteristics of the activation material 210. For example, the hydrophobicity and/or viscosity of the activation material 210 may be directly related to the wicking behavior or the wicking response of the indicator. Wicking behavior of the LSM 220 can also be controlled based on the thermal printed areas on the LSM 220. For example, in FIGS. 6A-6C the direct thermal printed areas can act as a barrier by creating two boundaries 260c and 260d that inhibit or restrict the flow of the activation material 210. The width of the two boundaries 260c and 260d can be modified to adjust the wicking behavior as well. For example, if the thermally printed lines that create barriers 260c and 260d are too small, the barriers 260c and 260d may allow some of the activation material

210 to diffuse through the boundary, which is undesirable. However, as illustrated in FIGS. 6A-6E, the boundaries 260c and 260d are sized and shaped such that they adequately bound and direct the flow of the activation material 210 along the channel 270 formed by the boundaries 260c and 260d.

In an example, barriers 260 were tested using different widths varying from 0.3 mm to 2.25 mm. In one test, the barriers 260 with widths in the 0.3 mm range were too small allowing the activation material 210 to flow freely through the barrier. Additionally, tests were conducted to determine the amount of activation material 210 required to achieve an appropriate wicking response. Insufficient quantities activation material 210 may prevent the activation material 210 from reaching the end of channel 270. Specifically, the amount or quantity of activation material 210 dispensed in activation region 214 of the indicator 205 may influence the wicking response of the indicator 205. Typically, the more activation material 210 causes further progressions of wicking, but too much activation material may cause diffusion of the activation material outside of barriers 260.

It should be appreciated that the wicking behavior or the wicking response described above is the same type of diffusion or flowing of the activation material 210 through the LSM 220 described in relation to FIGS. 2A-2C and FIGS. 4A-4C. However, the initial placement of the activation region 214 and the creation of channel 270 creates a wicking behavior of the indicator. Specifically, as the activation material 210 transitions from the non-activated state to the activated state, the activation material 210 begins to flow and diffuse through the LSM 220. As the activation material 210 flows and diffuses through the LSM 220, the activation material 210 diffuses through the LSM 220 in all directions until reaching a boundary 260. As the activation material 210 sufficiently saturates the LSM 220, the LSM transitions from the obscuring form to the non-obscuring form. Therefore, the speed of the wicking response is dependent not only on (i) the environmental exposure that initiates the activation material 210 transitioning to the activated state, but also (ii) the time delay between the activation material 210 beginning to diffuse through the LSM 220 and the LSM 220 becoming sufficiently saturated to transition to the non-obscuring form, thereby revealing the indicia 230.

The characteristics of the wicking response of the indicator 200 may be tunable. For example, a response temperature or activation threshold of the activation material 210 may be tuned based on the melting point of the activation material. Alkanes, such as n-alkanes have different melting points and many n-alkanes have sharp melting point transitions. Blending different alkanes may provide mixtures or compositions for an activation material 210 with different temperature responses or activation thresholds. Additionally, side-chain crystalline polymers ("SCCs") may also be polymerized to achieve specified melting pints. Furthermore, blending alkane wax and an SCC polymer may form an activation material 210 with a specific activation temperature and flow properties.

The wicking response may also be tuned for speed or response time. For example, alkane waxes and SCC polymers may be combined in different ratios or concentrations to adjust the viscosity and other flow properties of the activation material 210. Examples of various combinations of SCC polymers and C18 alkanes along with their respective Bingham viscosities are described below in Table 1. The viscosity of the activation material 210 may be directly correlated to how quickly the activation material 210 flows, diffuses and/or moves through the light scattering material 220. It should be appreciated that viscosity of the activation material 210 may change as the temperature of the activation material 210 changes. Typically, an SCC is more viscous than an alkane blend, so the response time can be slowed down by increasing the ratio of SCC to alkane wax. In an embodiment, a container may contain a substance the spoils upon exposure to elevated temperatures for a prolonged period of time; the wicking response may be tuned for a response to such temperatures over that time period.

Additionally, the synthesis process of the SCC material may also provide variation in the viscosity and flow properties of the activation material 210. For example, by adjusting the backbone length of the SCC, the viscosity may be tuned because as more monomers are incorporated in the backbone of the SCC (e.g., resulting in a larger molecular weight), the greater the viscosity of the SCC becomes. Thus, the viscosity of the SCC may be adjusted without changing the melting temperature or activation threshold of the activation material 210. Table 1 below provides several illustrative examples of various combinations of SCC polymers and C18 alkanes along with their respective Bingham viscosities. As illustrated in Table 1 below, the wicking response is influenced by the viscosity of the activation material. Typically, the more viscous the activation material 210, the slower the activation material 210 travels down the wick or channel 270. For example, referring to FIG. 6E, the first example blend containing 25% SCC polymer and 75% C18 alkanes may have a viscosity of 8.7 cps and may take approximately 18 minutes to reach the end of the channel 270, thereby revealing the indicia 230 "SPOILED". Conversely, the other blends described in Table 1 may take approximately 60 minutes and over 14 hours to reach the end of the channel 270, respectively.

TABLE 1

| Example Activation Material Blends | | | |
| --- | --- | --- | --- |
| % SCC | % C18 | Bingham Viscosity at 26° C. (cps) | Time to reach endpoint (e.g., end of channel) |
| 25 | 75 | 8.7 | 18 min |
| 50 | 50 | 38 | 60 min |
| 75 | 25 | 147 | >14 hrs |

Figure 7:
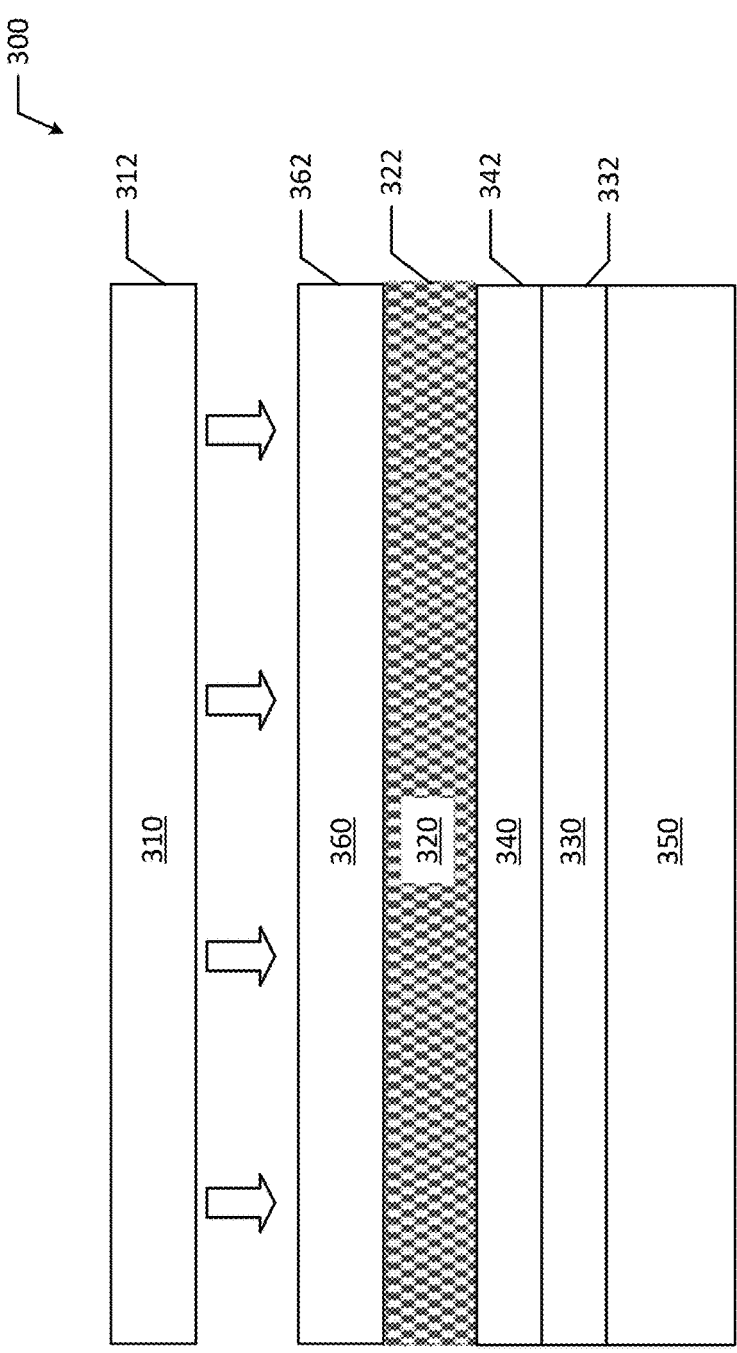
FIG. 7 illustrates an environmental exposure indicator, according to an example of the present disclosure.

FIG. 7 illustrates an example environmental exposure indicator 300. The indicator 300 may include an activation material 310 provided as an activation layer 312, a resilient material 360 provided as a resilient layer 362, a light scattering material 320 provided as a LSM layer 322, an indicia 330 and a substrate 350. The indicia 330 may be provided along with other indicia in an indicia layer 332. Additionally, the indicator 300 may optionally include a sealing material 340 arranged in a boundary layer or a sealing layer 342, which may be provided to create a boundary between the cavitated material 320 and the indicia 330 to prevent the activation material 310 from interacting with (e.g., flowing on, staining or obstructing) the indicia 330.

In the illustrated example, the indicator 300 includes an activation material 310 that is arranged as a LSM layer 322. For example, the activation material 310 may initially be arranged in an activation layer 312, which may be formulated as a matrix or a matrix layer overlaying the LSM layer 322. As noted above, the activation layer 312 may be configured as a matrix layer that comprises a mobile phase fluid suspended in a matrix overlaying the LSM 320. Different matrices can be selected, with varying properties of suspending the activation material 310 (e.g., a mobile phase fluid), which allows for a customizable activation layer 312. The activation layer 312 may include an acid (e.g., a phosphoric acid) suspended in a matrix with a resin, such that the activation layer 312 may be applied overlaying the LSM layer 322. A tailorable resilient material 360, which may be formulated as a resilient layer 362 may also be utilized to modulate the obscurability of the LSM layer 322. The light scattering material 320 may be a cavitated material and the LSM layer 322 may be a cavitated layer. Tailoring of the resilient layer 362 allows for a broad range of a temperature exposure indicator indicators to be used on products with varying shelf lives.

It will be appreciated that, the indicator 300 may be tailored by adjusting the activation material 310 thereby controlling the mobility of the activation material 310 when in the activated state, adjusting the activation layer 312 (e.g., by adjusting the matrix), adjusting the resiliency or permeability of the LSM layer 322, etc. Different examples of varying mobility of the activation material 310 are provided above in Table 1.

Figure 8A:
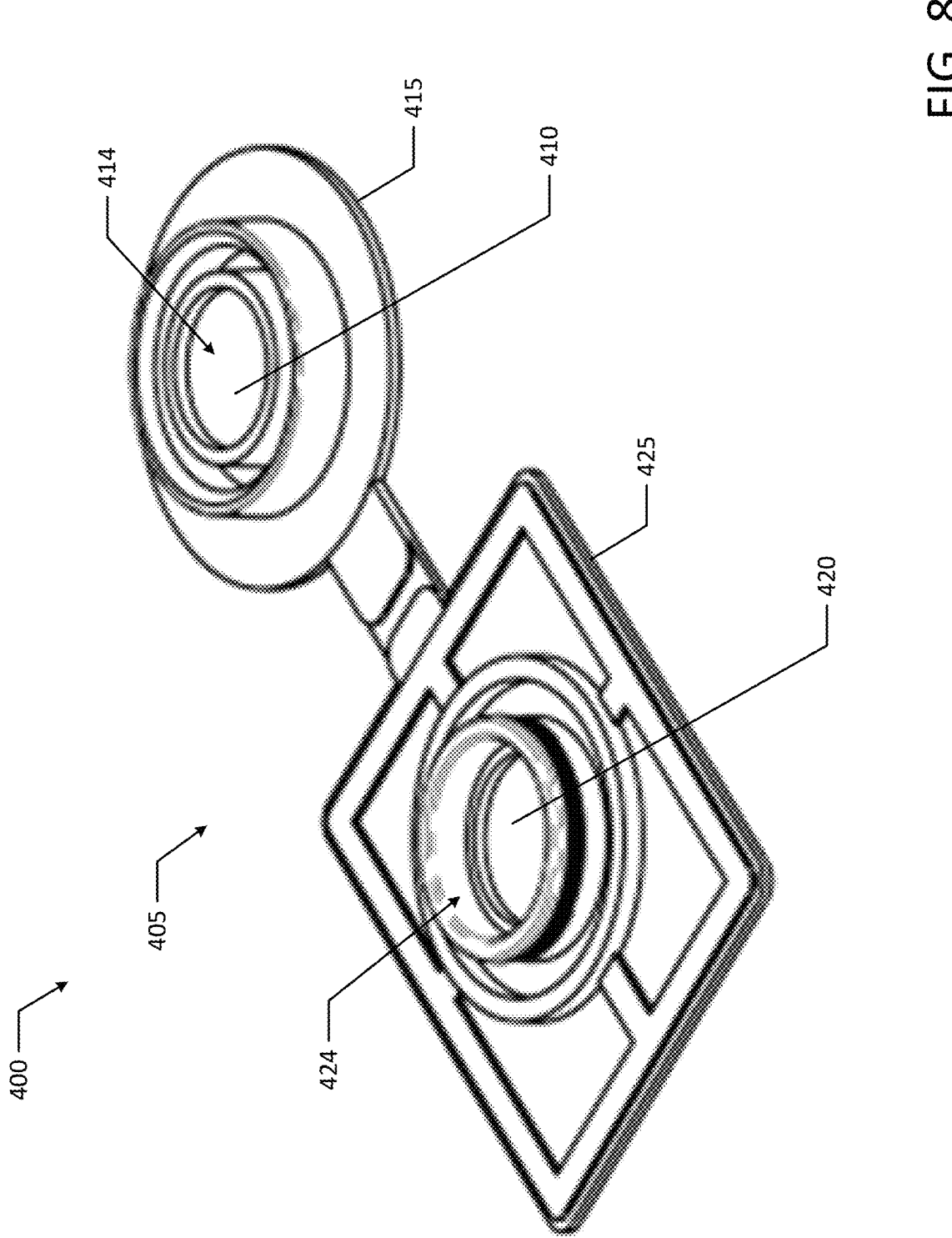
FIG. 8A illustrates a perspective view of an environmental exposure indicator in the open position, according to an example of the present disclosure.

FIG. 8A illustrates a perspective view of an environmental exposure indicator 400 in a non-deployed orientation (e.g., an open position). The indicator 400 may be a visual warning indicator. In the illustrated example, the indicator 400 includes a housing 405 having a first cavity 424 and a second cavity 414. The second cavity 414 may be formed in a second portion 415 (e.g., top portion) of the housing 405, which may be a removable cap. The first cavity 424 may be formed in a first portion 425 (e.g., bottom portion) of the housing 405, which may be a base layer of the housing 405 adapted for attaching to a product.

Additionally, the indicator 400 includes a masking layer 420 that is positioned in the first cavity 424. The masking layer 420 may be analogous to the light scattering material 120 of FIGS. 1A-1C, the cavitated material 220 of FIGS. 2A-C, or the cavitated material 320 of FIG. 4. The activation material 410 is disposed within the second cavity 415. The activation material 410 may have the same chemistry and features as the activation materials 110, 210 and 310 described above.

Figure 8B:
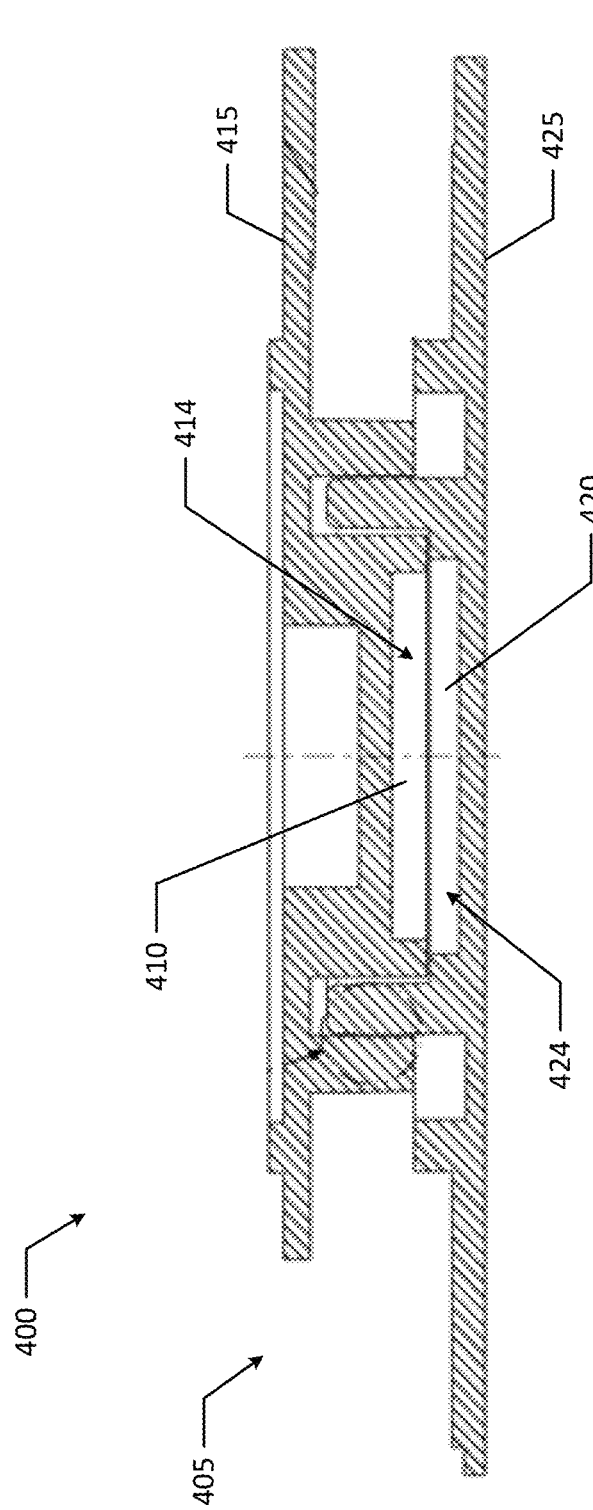
FIG. 8B illustrates a cross sectional view of an environmental exposure indicator in the activated state or closed position, according to an example of the present disclosure.

FIG. 8B illustrates a cross-sectional view of the indicator 400 in the deployed orientation (e.g., when the second portion 415 and the first portion 425 of the housing 405 are joined together and the housing 405 is in a closed position). The portions of the housing 405 may be joined together when the indicator 410 indicator is ready to be applied to a product (e.g., a heat-sensitive commercial product) and placed in a deployed orientation. In an example, the housing 405 is arranged into the deployed orientation (e.g., closed position) by placing the second cavity 414 over the first cavity 424 such that the contents of each cavity are in fluid communication with each other. Specifically, in the deployed orientation, the activation material 410 and the masking layer 420 are in communication with each other and both contained within the closed housing 405.

Figure 8C:
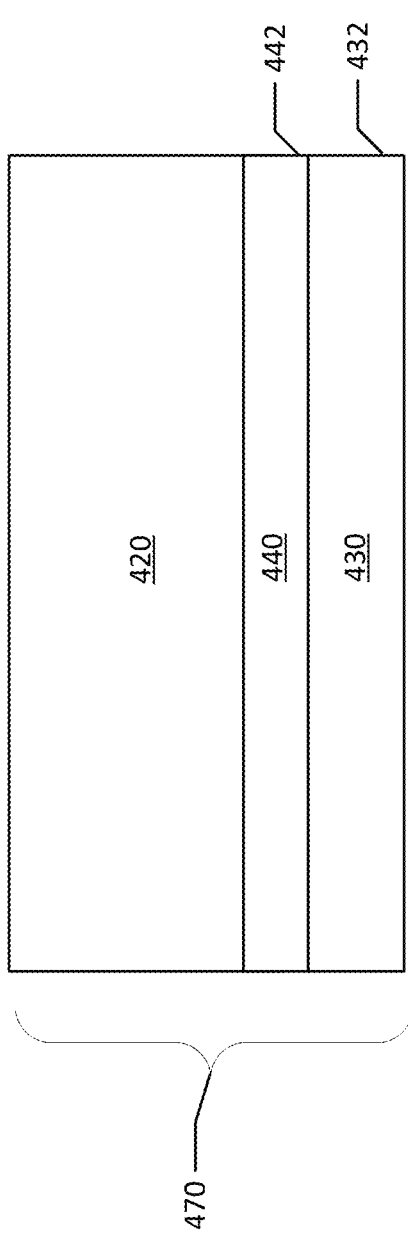
FIG. 8C illustrates a masking insert of the environmental exposure indicator, according to an example the present disclosure.

FIG. 8C illustrates an example configuration of the masking layer 420. In the illustrated example, the masking layer 420 may be formed as an insert 470. For example, the masking insert 470 may have multiple layers, such as a LSM layer 412, and optional sealing layer 442 and an indicia 430, which may be provided in an indicia layer 432.

The masking layer 420 may have the same or similar characteristics as the light scattering material 120 or any of the LSM layers described above. As illustrated in FIG. 7C, the insert 470 may include an optional sealing layer 442, which may be provided to retain the flow of activation material 410 from seeping into the indicia layer 432 when the indicator 400 is in the closed or active state. The indicia layer 432, when decipherable, provides an indication that the indicator 400 has been exposed to an activation event beyond an activation threshold. For example, the activation event may be a temperature greater than or equal to the activation threshold (e.g., a predetermined threshold temperature). The indicia layer 432 may be a colored filmed and may include a data form (e.g., a machine readable symbol).

Referring back to FIGS. 7A and 7B, in some embodiments, the masking layer 420 may comprise a rough side and a smooth side. The smooth side has a larger surface area for contacting and communicating with the activation material 410 than the rough side, which may advantageously provide enhanced transfer of the activation material 410 through the masking layer 420. For example, the additional surface area of the smooth side may better allow the formulation of the activation material 410 to cross an interface between the layers once activated.

In one example, the activation material 410 is impregnated in a porous disc, such as a POREX® disc and positioned within cavity 414. The masking layer 420 was also formulated as a porous disc, such as a POREX® disc and positioned with cavity 424. The POREX® discs may have a smooth side and a rough side. Improved performance of the indicator 400 was observed when the smooth side of each disc were arranged such that the smooth sides are in contact with each other in the closed or deployed orientation.

Figure 9A:
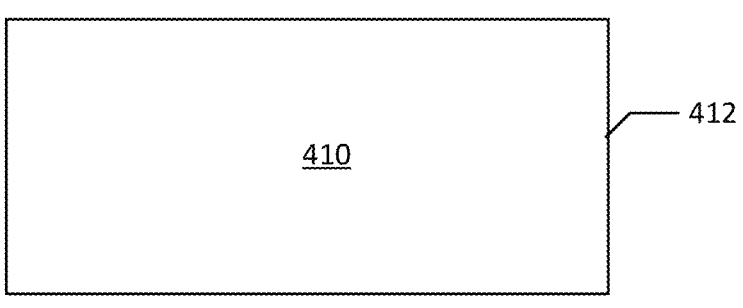
FIGS. 9A, 9B and 9C illustrate various activation material configurations, according to examples of the present disclosure.

FIG. 9A illustrates an example configuration where the activation material 410 is provided as a layer or as an insert within cavity 414. In the configuration illustrated in FIG. 9A, the activation material 410 can melt and become flowable in response to an activation event. For example, the activation event may be a temperature greater than or equal to the activation threshold. As the activation material 410 transitions from a non-activated state to an activated state, the activation material 410 flows from the cavity 414 onto the masking layer 420 and begin to diffuse through the masking layer 420.

Figure 9B:
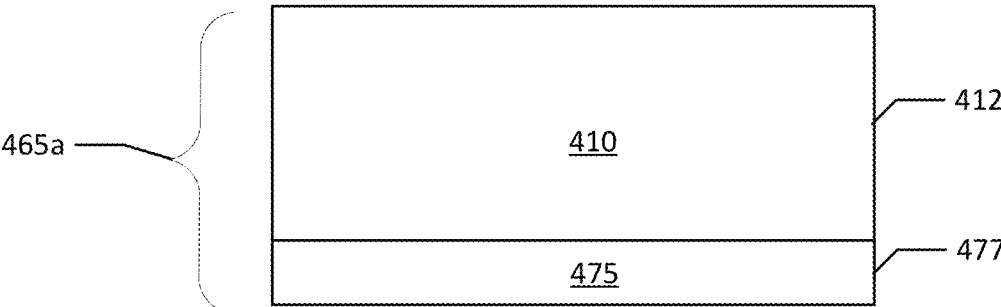

FIG. 9B illustrates an example configuration of an activation component ("AC") 465a. The AC refers to a material or combination of materials working together such that at least a portion of the AC is configured to transition the masking layer 420 from an obscuring form to a non-obscuring form. The AC may be arranged as a reservoir of activation material 410 retained by a layer 477 or plug of the retaining component 475. The retaining component 475 may be wax based and may melt in response to the activation event. When the retaining component 475 enters a fluid state, the activation material 410 is released and thus able to flow onto the masking layer 420 in response to an activation event. In the example illustrated in FIG. 9B, the activation material 410 may start in a fluid state and may remain in a fluid state regardless of the environmental exposure. For example, the activation event may be a temperature greater than or equal to the activation threshold, but the activation event may only affect the state of the retaining component 475, which upon melting releases the activation material 410.

Figure 9C:
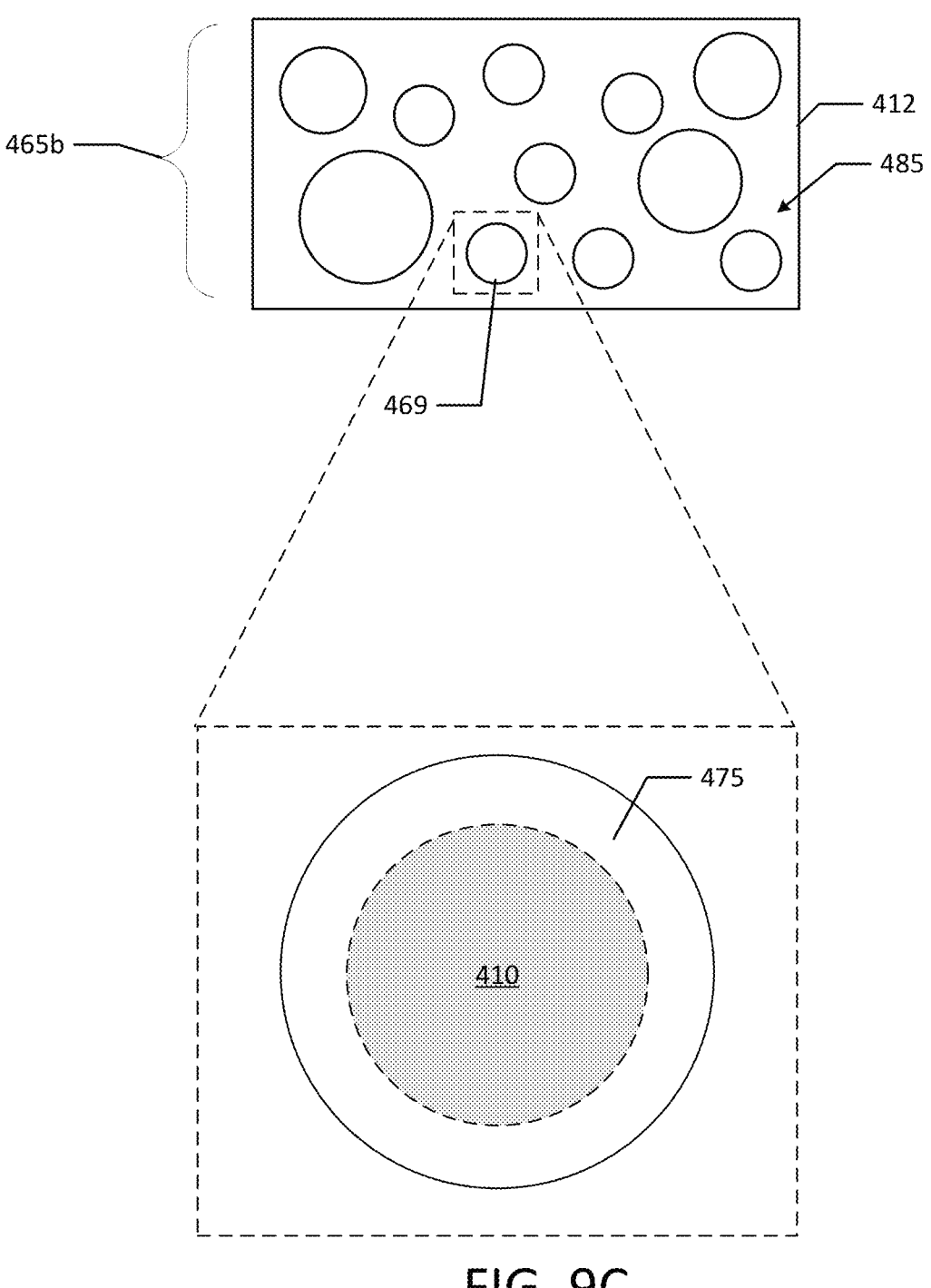

FIG. 9C illustrates an example configuration of an AC 465b. As illustrated in FIG. 9C, the activation material 410 may be provided as a plurality of encapsulations 469. Each encapsulation may be arranged in a matrix structure 485. The encapsulations 469 are each configured as a reservoir of activation material 410 retained by outer shell of the retaining component 475, which surrounds the reservoir of activation material 410. Similar to the configuration referenced in FIG. 9B, the retaining component 475 may be wax based and may melt in response to the activation event. When the matrix structure 485 is exposed to higher temperatures, some of the outer shells of the retaining components 475 may melt, thereby releasing their associated activation material onto the masking layer 420. Specifically, once the retaining component 475 enters a fluid state (e.g., melts), the activation material 410 is able to flow onto the masking layer 420 in response to the activation event.

FIGS. 10A, 10B, 10C and 10D illustrate various examples of light scattering material 120. Specifically, in the example illustrated in FIG. 10A, the LSM 120 may be a porous material with channels 510 of void(s) 550 that travel from one side of the material to the other side of the material such that there are void(s) 550 at both surface interfaces. The void(s) 550 may similar to voids 150 described in FIGS. 2A-2C.

Figures 10A, 10B, 10C, 10D:
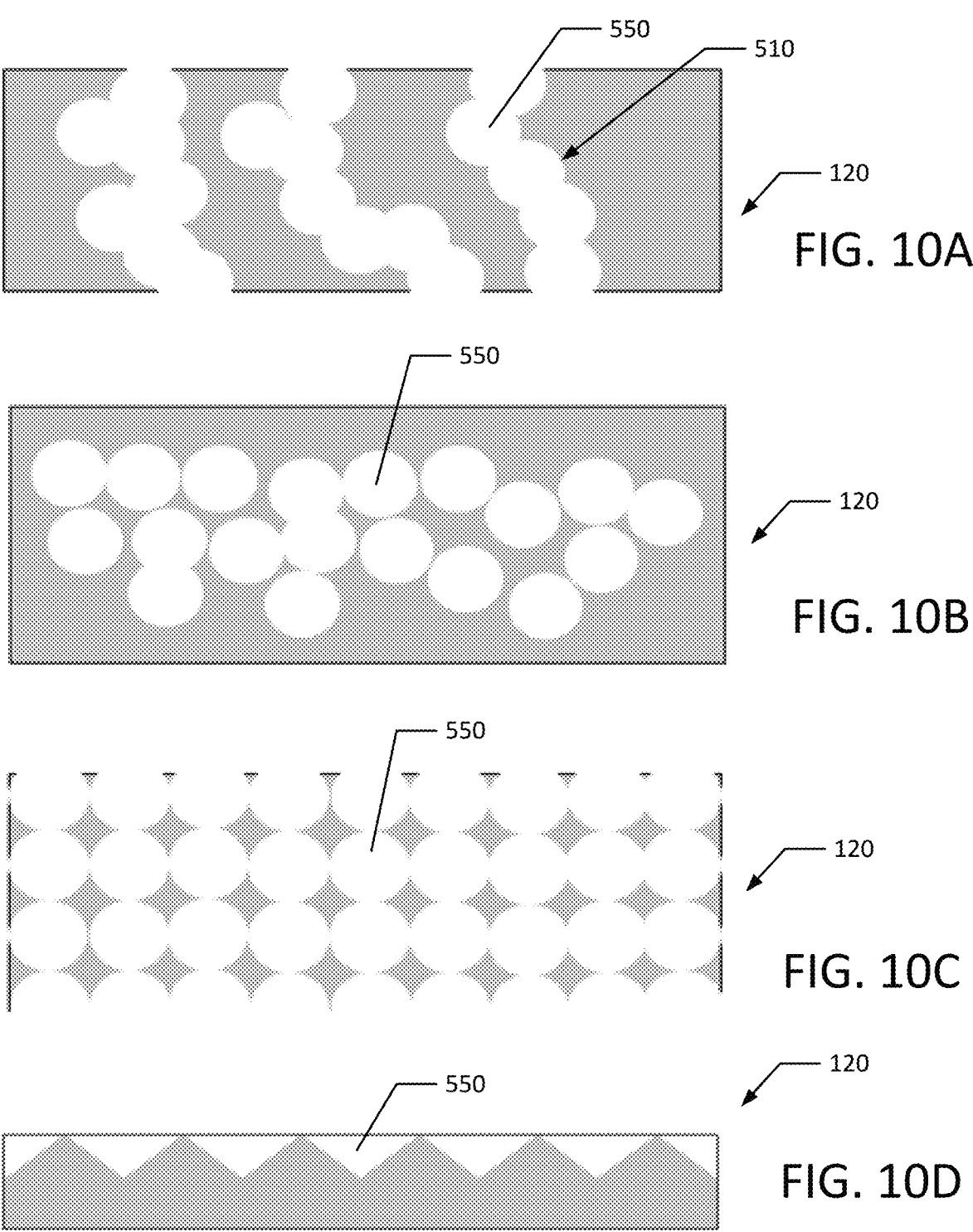
FIGS. 10A, 10B, 10C and 10D illustrate various examples of light scattering material, according to examples of the present disclosure.

As illustrated in FIG. 10B, the LSM 120 may include void(s) 550, similar to the voids 150 described in FIGS. 2A-2C, without any void(s) 550 or voids at the surface interfaces.

As illustrated in FIG. 10C, the LSM 120 may include a uniform arrangement of void(s) 550 that are evenly distributed throughout the material. Similar to the LSM 120 illustrated in FIG. 10A, the void(s) 550, such as voids, travel from one side of the material to the other side of the material such that there are void(s) 550 at both surface interfaces. The void(s) 550 may be similar to voids 150 described in FIGS. 2A-2C.

As illustrated in FIG. 10D, the LSM 120 may include void(s) 550. For example, one of the surface interfaces may be a textured or rough surface with void(s) 550 that are adapted to receive activation material 110. An example of the LSM 120 illustrated in FIG. 10D may include a micropillar array film, a nanopillar array film, or the like. The films may be prepared by laser etching the film to create an appropriate surface profile including the void(s) 550. In another example, the LSM 120 may be prepared by chemical deposition. Similar to the examples described above and the examples described in FIGS. 2A-2C, as an activation material 110 fills the void(s) 550, the LSM 120 may transition from the obscuring form to the non-obscuring form.

Activation Material

The contents of this section apply to any of the activation materials described herein. In this section, activation material 110 will be referenced as an illustrative example, but it should be understood that the description also applies to activation material 210, 310, 410 etc. An activation event may be any environmental exposure or event that an activation material 110 is sensitive to or responsive to. In many examples described herein, an activation event is associated with temperature exposure (e.g., cumulative temperature exposure). As used herein, the term "melting temperature", or "melting point" refer to the temperature at which a material exhibits peak unit heat absorption per degree Celsius, as determined by differential scanning calorimetry. Above its melting temperature, the meltable material can exhibit liquid properties and can move, for example, flow or diffuse.

In some examples, the activation material 110 is a meltable material that is responsive to changes in temperature. For example, the meltable material may have a melting point at an activation threshold that is associated with a predetermined heat exposure, such as a predetermined cumulative ambient heat exposure and/or a predetermined peak ambient heat exposure. For indicating heat exposure, the activation material 110 may be a meltable solid which is configured to transition to a flowable state upon melting at a predetermined temperature.

In some examples, the activation material 110 comprises at least one of a polymer having side chain crystallinity (SCC), an alkane, an alkyl ester, and a wax. The wax may be an alkane wax, a natural wax, a modified natural wax, a paraffin wax, a microcrystalline wax, carnauba wax, beeswax, Chinese wax, shellac wax, palm wax, soy wax, and combinations thereof.

The SCC may be a polymer or a copolymer having at least one crystallizable side chain selected from the group consisting of a $C_{4-30}$ aliphatic group, a $C_{6-30}$ aromatic group, a linear aliphatic group having at least 10 carbon atoms, a combination of at least one aliphatic group and at least one aromatic group, the combination having from 7 carbon atoms to about 30 carbon atoms, a $C_{10}$-$C_{22}$ acrylate, a $C_{10}$-$C_{22}$ methacrylate, an acrylamide, a methacrylamide, a vinyl ether, a vinyl ester, a fluorinated aliphatic group having at least 6 carbon atoms, a p-alkyl styrene group wherein the alkyl group has from about 8 carbon atoms to about 24 carbon atoms, and combinations thereof. The SCC polymer may also be a polymer or a copolymer having crystallizable side chains of $C_{10}$-$C_{22}$ acrylate or $C_{10}$-$C_{22}$ methacrylate.

In some examples, the activation material comprises at least one of an undecane, a dodecane, a tridecane, a tetradecane, a pentadecane, a hexadecane, a heptadecane, an octadecane, a nonadecane, an eicosane, a heneicosane, a hexanoic acid, and ethyl lactate. In other examples, the activation material may include spermaceti, tallow, 15 lanolin, wool grease, a waxy polymer, a waxy copolymer, a polyolefin, polyethylene, polypropylene, an ethylene-vinyl acetate copolymer, an ethylene-acrylic acid copolymer, and combinations thereof.

In some embodiments, the activation material is selected from the group consisting of an acid, ethyl-vinyl-acetates, glycols, adipates, sebacates, terephthalates, dibenzoates, gluterates, phthalates, azelates n-alkanes, side chain crystallinity (SCC), waxes, esters polyamides or polyolefins.

In examples where the activation material includes an acid, the acid may be selected from the group consisting of phosphoric acid, dodecylbenzene sulfonic acid, benzene-sulfonic acid or squaric acid.

Activation Events and Activation Thresholds

An activation event may be any environmental event or environmental exposure the activation material responds to. In several examples, the activation material is sensitive to or responsive to temperature changes. The activation event may be heat exposure, such as a cumulative heat exposure, a peak heat exposure or exposure to a specified temperature for a period of time. Similarly, an activation threshold may be a threshold exposure level associated with the activation material. The activation threshold may be (i) a predetermined cumulative heat exposure threshold, (ii) a predetermined peak heat exposure threshold or (iii) a time-temperature exposure threshold.

In some examples, the peak heat exposure threshold is in a range from about 0° C. to about 65° C., from about 0° C. to about 50° C., from about 0° C. to about 40° C., from about 0° C. to about 30° C., from about 0° C. to about 20° C., from about 0° C. to about 10° C., from about 10° C. to about 65° C., from about 15° C. to about 65° C., from about 25° C. to about 65° C., from about 35° C. to about 65° C., from about 45° C. to about 65° C., from about 0° C. to about 15° C., from about 5° C. to about 15° C., from about 15° C. to about 25° C., from about from about 25° C. to about 35° C., from about from about 35° C. to about 45° C., from about 5° C. to about 10° C., from about –20° C. to about 0° C., from about –20° C. to about –15° C., from about –20° C. to about –10° C., and from about –20° C. to about –5° C. How achieved—just need one or two sentences . . . by tuning the SCC polymer mostly I think . . . . The peak heat exposure threshold can be tuned based on the melting point of the activating material selected. A variety of n-alkanes are commercially available having sharp melting point transitions. Blending different alkanes can also give rise to different melting temperatures. Side-Chain Crystalline Polymer (SCC) can also be polymerized to achieve specified melting points.

Light Scattering Materials and Cavitated Materials

The contents of this section apply to any of the light scattering materials, cavitated materials and masking layers described herein. In this section, light scattering material 120 will be referenced as an illustrative example, but it should be understood that the description also applies to cavitated materials 220 and 320 as well as masking layer 420. The light scattering material 120 may be made from a porous plastic selected from the group consisting of Polytetrafluoroethylene (PTFE), Ultra High Molecular Weight Polyethylene (UHMW PE), Ultra High Molecular Weight Polypropylene (UHMW PP), High Density Polyethylene (HDPE) Polyvinylidene Fluoride (PVDF), Perfluoroalkoxy alkane (PFA), Liquid Crystalline Polymer (LPC) and Xydar® LCP. It should be appreciated that the light scattering material 120 may also be made from any combination of the plastics described above. Additionally, the light scattering material 120 may include other materials in addition to the plastics described above.

In some examples, the light scattering material 120 may include various opaque or transparent papers, such as different grades of filter paper, including fine-pored and coarse-pored papers, pulverized filter paper, and any combinations thereof. The light scattering material 120 may also include non-woven fibrous materials formed of natural or synthetic fibers, fine silica gel, porous films containing polytetrafluoroethylene resin or silica gel, TESLIN® microporous synthetic sheet (PPG Industries, Pittsburgh, Pa.), and combinations thereof. Additionally, the light scattering material 120 may include non-woven, spun bonded materials, including non-woven, spun-bonded high-density-polyethylene, polypropylene, and polyester as well as other non-woven, spun-bonded synthetic polymers, and non-woven, spun-bonded blends of any two or more such polymers, and any combinations thereof.

In some embodiments, POREX® (Porex Filtration Group; Parafix Tapes & Conversions Ltd., UK) are utilized as the light scattering material. The POREX® material may have a rough side and a smooth side, and the smooth side may have a larger surface area or larger contact area as opposed to the rough side. He POREX® material may be sized and shaped as disc-shaped insert. When two POREX® discs are utilized in a single temperature exposure indicator, improved performance of the temperature exposure indicator has been shown when the POREX® discs are configured to have the smooth side of each disc in contact with each other.

In some embodiments, light scattering material is structured such that the material is configured to cause incident light to scatter and the light scattering properties of the material is adapted to mask or conceal an indicia positioned beneath the light scattering material. For example, light scattering can mask or conceal the inherent appearance of the indicia. The light scattering may be random scattering of incident light as well as other scattering phenomena described above.

In some embodiments, a cavitated tie layer overlaying the indicia is utilized as the light scattering material. In some examples, the cavitated tie layer contains voids such that the cavitated tie layer is non-transparent (obscured) in an obscuring form and transparent in non-obscuring form. In the obscuring form, the indicia is not visible through the cavitated tie layer. Conversely, when the indicia is in the non-obscuring form, the indicia is visible through the cavitated tie layer.

In some embodiments, a tailorable resilient layer may also be utilized to modulate the transparency of the cavitated tie layer. This is a layer that can be tailored by controlling the resiliency and/or permeability of the coated layer. Tailoring of resilient layer allows for a broad range of a temperature exposure indicator indicators to be used on products with varying shelf lives. Additionally, thermal printing may be utilized to modulate the resiliency and/or permeability of the cavitated tie layer. For example, direct thermal printing results in melting the cavitated or voided layer (making it appear transparent). The thermal printed patterns or regions function as a barrier, inhibiting or restricting the flow of the fluid activating material to a specific region of the cavitated tie layer.

Indicia

In some examples, an indicia is overlayed by the light scattering material such that the indicia is initially obscured by the light scattering material prior to the meltable material being exposed to a temperature above the activation threshold. Upon the meltable material being exposed to a temperature above the activation threshold, the indicia becomes observable as an indication that the heat-sensitive commercial product that the indicator has been applied to has been exposed to temperature equal to a greater than the threshold temperature. The indicia can include a colored laminate region located adjacent the light scattering material. For example, the colored laminate region located adjacent the light scattering material could be colored red so that the red coloring is decipherable through the light scattering material.

In some examples, the indicia can be a dataform. The dataform can be created from materials, such as ink, dye, paint, toner, or wax may be used to color a surface or create a layer to produce an image, text, graphic, machine-readable symbol or barcode symbol. As used herein, a barcode symbol is a machine-readable pattern encoding data. The barcode symbol is one type of dataform. Other types or examples of dataforms include text, numbers, graphics, etc. Text is a dataform representing written language, numbers are dataforms representing arithmetical values, and graphics are dataforms representing images.

As noted above, the dataform may be a machine-readable symbol, such as a barcode symbol. The barcode symbol may be made up of one or more barcode elements, which may be referred to as a barcode module. An element or module is a set of contrasting patterns that are arranged on a substrate to facilitate decoding data by a barcode reader or scanner. A barcode element or module may describe both a "black" box and a "white" box, or a "light absorbing" box and a "light reflective" box. In other examples, a barcode element or module may also describe a "light emitting" element, if luminescent materials are used. Some barcode symbols include quiet space(s), a region surrounding a set of elements or modules, which is free of contrasting marks, to enable the barcode reader to detect the barcode symbol in a captured image. Some barcode symbols include elements or modules, called finder patterns that provide a consistent pattern to enable the barcode reader to detect the barcode symbol in a captured image.

The procedure in which data is encoded in the barcode symbol, the arrangement of the barcode elements or modules within the barcode symbol, and any requirements for elements or modules and quiet space are defined by a set of rules, known as a barcode symbology. Data may be encoded into the contrasting patterns by software, such as a computer application or printer firmware.

Barcode symbols, which may be generally referred to herein as barcodes, may be displayed on a screen or marked on a substrate. Barcode elements or modules may be marked on a substrate in a variety of ways. Black bars (rectangles, squares, circles, or triangles, or other shapes are generally called bars, or elements, in a barcode) may be printed on a white or mirrored substrate to create the contrasting pattern of an element or module. Similarly, white patterns may be printed on a black or transparent substrate to create the contrasting pattern of an element or module. In either case, a barcode reader would capture an image of the barcode by receiving light reflected from the white portions of the element or module at a greater intensity than light reflected from the black portions of the element or module. The contrasting intensity pattern of the captured image is then processed by the barcode reader to decode the data carried by the barcode. In some embodiments, a reflective or mirrored surface may provide the contrasting pattern. Barcode elements or modules may also be marked on a substrate by etching or denting a smooth surface; in this case light is received at different intensities from a smooth surface than the textured surface.

The barcode symbols may be used in many industries to facilitate fast and accurate entry of data. Documents with barcodes may be printed on labels, tags, wristbands, packaging, and other substrates in many ways. Paper documents and wristbands may be printed on laser printers which charge a drum with a rendered image, attract toner to the charged image, and apply that toner to a document or wristband form, then fuse the toner to the substrate using a heated roller. Thermal printing may be particularly well-suited to printing barcodes because commercially available barcode label printers are configured to render a barcode and print it on a label, tag, wristband, plastic card, RFID smart label, or similar substrates at high-speed while maintaining crisp edge contrast between dark elements and bright elements of the barcode, to handle webs of labels or wristband with excellence dimensional tolerance, and to connect easily to various computer systems and networks.

Seal or Boundary Layer

As noted above, the sealing material or boundary material, which may optionally be provided in as a seal layer or a boundary layer is adapted to prevent activation material from flowing onto the indicia. In some embodiments, the seal layer includes at least one of styrene-butadiene binder, styrene acrylic binder, vinyl acrylic binder, polyamides, pressure sensitive adhesives (PSA) or acrylic water-based emulsion.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. A visual warming indicator comprising:
a substrate;
an indicia on the substrate;
a activation region containing an activation material configured to transition from a non-activated state to an activated state at an activation threshold;
a layer of material wherein a portion of the layer of material has voids which cause the portion of the layer of material to be light scattering and wherein a different portion of the same layer of material defines at least one barrier, the at least one barrier configured to inhibit flow of the activation material when the activation material is in the activated state, the at least one barrier forming a channel, wherein the activation region is on the layer of material and not overlaying the indicia;
the portion of the layer of material overlays the indicia such that the indicia is initially obscured by the portion of the layer of material prior to the activation material being exposed to an activation event at or above the activation threshold; and
wherein the activation region is in fluid communication with the portion of the layer of material overlying the indicia, such that the activation material, when exposed to an activation event at or above the activation threshold, is configured to transition to the activated state and flow from the activation region along the channel into the voids of the portion of the layer of material thereby causing the portion of the layer of material to transition from an obscuring form to a non-obscuring form so that the indicia is viewable through the portion of the layer of material.

2. The indicator of claim 1, wherein the activation material is a meltable material and the activation event is exposure to a temperature over the activation threshold causing melting of the activation material, and the activation material, when melted, is configured to, after flowing into voids of the portion of the layer of material, solidify within the voids of the portion of the layer of material upon return to a temperature below the activation threshold, such that the portion of the layer of material remains in the non-obscuring form and the non-obscuring form is transparent.

3. The indicator of claim 1, wherein the layer of material is made from a porous plastic material selected from the group consisting of Polytetrafluoroethylene (PTFE), Ultra High Molecular Weight Polyethylene (UHMW PE), Ultra High Molecular Weight Polypropylene (UHMW PP), High Density Polyethylene (HDPE), Polyvinylidene Fluoride (PVDF), Perfluoroalkoxy alkane (PFA), and Liquid Crystalline Polymer (LPC).

4. The indicator of claim 1, wherein the indicia includes at least one of a color and a dataform.

5. The indicator of claim 4, wherein the dataform is a machine readable symbol.

6. The indicator of claim 1, wherein the activation material comprises at least one of a polymer having side chain crystallinity (SCC), an alkane, an alkyl ester, and a wax.

7. The indicator of claim 1, wherein the activation threshold is one of (i) a predetermined cumulative heat exposure threshold, (ii) a predetermined peak heat exposure threshold, and (iii) a time-temperature exposure threshold.

8. The indicator of claim 7, wherein the activation threshold is a peak heat exposure threshold in a range of from about 0° C. to about 65° C.

9. The indicator of claim 1, wherein the barrier was formed by collapsing voids in the different portion of the layer of material.

10. The indicator of claim 1, wherein the barrier was defined and formed by applying patterned energy to the different portion of the layer of material, causing voids to collapse in the different portion of the layer of material.

11. A visual warming indicator comprising:
a substrate;
an indicia on the substrate;
a reservoir containing an activation material configured to transition from a non-activated state to an activated state at an activation threshold;
a layer of material wherein a portion of the layer of material has voids which cause the portion of the layer of material to be light scattering and wherein a different portion of the same layer of material defines a barrier, the barrier configured to inhibit flow of the activation material when the activation material is in the activated state;
the portion of the layer of material overlays the indicia such that the indicia is initially obscured by the portion of the layer of material prior to the activation material being exposed to an activation event at or above the activation threshold; and
wherein the reservoir is in fluid communication with the portion of the layer of material overlying the indicia, such that the activation material, when exposed to an activation event at or above the activation threshold, is configured to transition to the activated state and flow into the voids of the portion of the layer of material thereby causing the portion of the layer of material to transition from an obscuring form to a non-obscuring form so that the indicia is viewable through the portion of the layer of material,
wherein the activation event is one of (i) a cumulative heat exposure, (ii) a peak heat exposure, and (iii) an exposure to a temperature for a period of time, and wherein the barrier is was formed by collapsing voids in the different portion of the layer of material.

12. A visual warming indicator comprising:
a substrate;
an indicia on the substrate;
a reservoir containing an activation material configured to transition from a non-activated state to an activated state at an activation threshold;
a layer of material wherein a first portion of the layer of material has voids which cause the first portion of the layer of material to be light scattering and wherein a different portion of the same layer of material defines a barrier, the barrier configured to inhibit flow of the activation material when the activation material is in the activated state;

the first portion of the layer of material overlays the indicia such that the indicia is initially obscured by the first portion of the layer of material prior to the activation material being exposed to an activation event at or above the activation threshold; and wherein the reservoir is in fluid communication with the first portion of the layer of material overlying the indicia, such that the activation material, when exposed to an activation event at or above the activation threshold, is configured to transition to the activated state and flow into the voids of the first portion of the layer of material thereby causing the first portion of the layer of material to transition from an obscuring form to a non-obscuring form so that the indicia is viewable through the first portion of the layer of material, wherein the activation threshold is one of (i) a predetermined cumulative heat exposure threshold, (ii) a predetermined peak heat exposure threshold, and (iii) a time-temperature exposure threshold, and wherein the barrier was defined and formed by applying patterned energy to the different portion of the layer of material, causing voids to collapse in the different portion of the layer of material.

13. A peak temperature exposure indicator comprising:

a reservoir containing a meltable material, the meltable material comprising a polymer having side chain crystallinity (SCC) and having a melting point at an activation threshold of the peak temperature exposure indicator, wherein the activation threshold is a peak temperature exposure in a range from about 5° C. to about 25° C.;

a light scattering material, made from an opaque Polytetrafluoroethylene (PTFE), having voids;

an indicia overlayed by the light scattering material such that the indicia is initially obscured by the light scattering material prior to the meltable material being exposed to a temperature above the activation threshold;

wherein the reservoir is in fluid communication with the light scattering material, such that the meltable material, when exposed to a temperature at or above the activation threshold, is configured to melt and flow into the voids of the light scattering material thereby causing the light scattering material to transition from an obscuring form to a non-obscuring form so that the indicia is viewable through the light scattering material; and wherein the meltable material, after flowing into the voids of the light scattering material, is configured to solidify within the voids of the light scattering material upon return to a temperature below the activation threshold, such that the light scattering material remains in the non-obscuring form.

14. A visual warming indicator comprising:

a housing having a first cavity and a second cavity;

a masking layer positioned in the first cavity and which overlays an indicia located adjacent to the first cavity;

a meltable activation material disposed in a nonactivated solid state within the second cavity;

wherein the first cavity is formed within a bottom portion of the housing, the second cavity is formed within a removable top portion of the housing, the top portion and the bottom portion being separated and the first and second cavities are not in fluid communication with each other when the visual warming indicator is in a non-deployed configuration, wherein joining the removable top portion of the housing with the bottom portion of the housing places the visual warming indicator in a deployed configuration, where the first and second cavities are in fluid communication with each other, wherein the masking layer is configured to visibly mask the indicia when the activation material is in a non-activated state in the first cavity; and wherein, when the visual warming indicator is in a deployed configuration, upon warming to an activation threshold, the activation material is configured to transition from the non-activated solid state to a melted activated state thereby flowing from the second cavity into the first cavity and onto the masking layer and causing the masking layer to transition from an obscuring form to a non-obscuring form, thereby visibly revealing the indicia when the masking layer is in the non-obscuring form.

15. The indicator of claim 14, the indicator-further comprising a second porous layer positioned in the second cavity.

16. The indicator of claim 15, wherein the activation material is disposed in the second porous layer.

17. The indicator of claim 14, wherein the indicia is provided on a film that is (i) coupled to a back side of the masking layer, (ii) coupled to a bottom portion of the first cavity, or (iii) positioned under the first cavity.

18. The indicator of claim 14, wherein the masking layer is made from a Polytetrafluoroethylene (PTFE) material.

19. The indicator of claim 18, wherein the PTFE material is an opaque PTFE material that is in the obscuring form prior to being contacted by the activation material.

20. The indicator of claim 14, wherein the masking layer is configured to visibly mask the indicia by obscuring visibility of the indicia until the masking layer reaches a saturation threshold of activation material.

* * * * *